US012566263B2

(12) United States Patent
Lee et al.

(10) Patent No.: US 12,566,263 B2
(45) Date of Patent: Mar. 3, 2026

(54) ELECTRONIC APPARATUS AND CONTROL METHOD THEREOF

(71) Applicant: SAMSUNG ELECTRONICS CO., LTD., Suwon-si (KR)

(72) Inventors: Jeongwon Lee, Suwon-si (KR); Jongyoub Ryu, Suwon-si (KR); Kyoungchoon Park, Suwon-si (KR); Keehwan Ka, Suwon-si (KR); Minjin Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 375 days.

(21) Appl. No.: 17/976,155

(22) Filed: Oct. 28, 2022

(65) Prior Publication Data

US 2023/0115748 A1      Apr. 13, 2023

Related U.S. Application Data

(63) Continuation of application No. PCT/KR2022/009640, filed on Jul. 5, 2022.

(30) Foreign Application Priority Data

Oct. 7, 2021   (KR) ........................ 10-2021-0133414

(51) Int. Cl.
    *G10L 25/78*     (2013.01)
    *G01S 15/12*     (2006.01)
    (Continued)

(52) U.S. Cl.
    CPC ............. *G01S 15/12* (2013.01); *G06F 3/167* (2013.01); *G10L 25/78* (2013.01); *H04R 1/20* (2013.01); *H04R 2430/21* (2013.01)

(58) Field of Classification Search
    CPC ......... G01S 15/12; G06F 3/167; G10L 25/78; H04R 1/20; H04R 2430/21
    See application file for complete search history.

(56) References Cited

U.S. PATENT DOCUMENTS 9,772,817 B2   9/2017  Jarvis et al.
9,843,882 B2   12/2017  Baba
    (Continued)

FOREIGN PATENT DOCUMENTS

EP     3 420 737 A0   1/2019
EP     3 420 737 B1   8/2023
    (Continued)

OTHER PUBLICATIONS

International Search Report and Written Opinion dated Oct. 25, 2022 issued in PCT Application No. PCT/KR2022/009640.
    (Continued)

*Primary Examiner* — Abdallah Abulaban
(74) *Attorney, Agent, or Firm* — STAAS & HALSEY LLP

(57) ABSTRACT

An electronic apparatus includes a communication interface, a microphone, and a processor configured to obtain a first expectation value for a first sound to be output from a first external electronic apparatus and a second expectation value for a second sound to be output from a second external electronic apparatus, control the communication interface to transmit a first sound output request signal to the first external electronic apparatus, obtain a first measurement value for the first sound, control the communication interface to transmit a second sound output request signal to the second external electronic apparatus, obtain a second measurement value for the second sound, and obtain a correction value for one or more of the first measurement value and the second measurement value based on the obtained first measurement value, the obtained second measurement value, the (Continued)

obtained first expectation value, and the obtained second expectation value.

19 Claims, 19 Drawing Sheets

(51) Int. Cl.
    *G06F 3/16*        (2006.01)
    *H04R 1/20*      (2006.01)

(56)         References Cited

U.S. PATENT DOCUMENTS

| | | | | |
|---|---|---|---|---|
| 10,176,810 | B2 * | 1/2019 | Kumar | G10L 15/30 |
| 11,361,765 | B2 | 6/2022 | Park | |
| 2008/0180228 | A1 | 7/2008 | Wakefield et al. | |
| 2008/0238661 | A1 * | 10/2008 | Camp | H04L 12/282 340/539.21 |
| 2015/0032456 | A1 | 1/2015 | Wait | |
| 2015/0219755 | A1 * | 8/2015 | Borggaard | G01S 5/30 367/118 |
| 2017/0083285 | A1 | 3/2017 | Meyers et al. | |
| 2017/0154638 | A1 * | 6/2017 | Hwang | G01S 3/808 |
| 2018/0211665 | A1 * | 7/2018 | Park | G10L 15/26 |
| 2019/0051304 | A1 | 2/2019 | Tian et al. | |
| 2019/0355365 | A1 | 11/2019 | Kim et al. | |
| 2019/0387344 | A1 * | 12/2019 | Kim | H04R 5/04 |
| 2020/0074988 | A1 | 3/2020 | Park et al. | |
| 2020/0105264 | A1 | 4/2020 | Jang et al. | |
| 2021/0099829 | A1 * | 4/2021 | Soto | G06F 3/048 |
| 2021/0174796 | A1 | 6/2021 | Chae et al. | |
| 2021/0335354 | A1 | 10/2021 | Park | |
| 2022/0254344 | A1 | 8/2022 | Park et al. | |

FOREIGN PATENT DOCUMENTS

| | | |
|---|---|---|
| JP | 2019-196999 | 11/2019 |
| JP | 2020-60951 A | 4/2020 |
| KR | 10-2018-0083587 | 7/2018 |
| KR | 10-2020-0037687 A | 4/2020 |
| KR | 10-2020-0050152 A | 5/2020 |
| KR | 10-2021-0008779 A | 1/2021 |
| KR | 10-2021-0035351 | 3/2021 |
| KR | 10-2021-0069977 | 6/2021 |
| KR | 10-2021-0116671 | 9/2021 |
| WO | WO 2017/147081 A1 | 8/2017 |
| WO | WO 2020/213767 A1 | 10/2020 |

OTHER PUBLICATIONS

Written Opinion dated Oct. 25, 2022 issued in PCT Application No. PCT/KR2022/009640.
Supplemental European Search Report dated Nov. 11, 2024 issued EP 22 87 8671.
Office Action dated Apr. 23, 2025 issued in European Application No. 22 878 671.1.
Office Action dated Oct. 27, 2025, issued in Korean Application No. 10-2021-0133414.
Examination Report dated Oct. 9, 2025, issued European Application No. 22878671.1.

* cited by examiner

FIG. 7

| # | DEVICE TYPE | SIGNAL POWER | WHITE NOISE | PINK NOISE | HIGH FREQ | LASTUPDATE | NETWORK | ... |
|---|---|---|---|---|---|---|---|---|
| 1 | RF9900R | 1026 | 10, | | | 2021-05-15 | ON | ... |
| 2 | WM9500 | 0 | 0, | | | 2021-05-14 | ON | ... |
| 3 | SOUNDBAR | 2012 | 13, | | | 2021-05-15 | ON | ... |
| ... | ... | ... | | | | ... | ... | ... |

FIG. 9

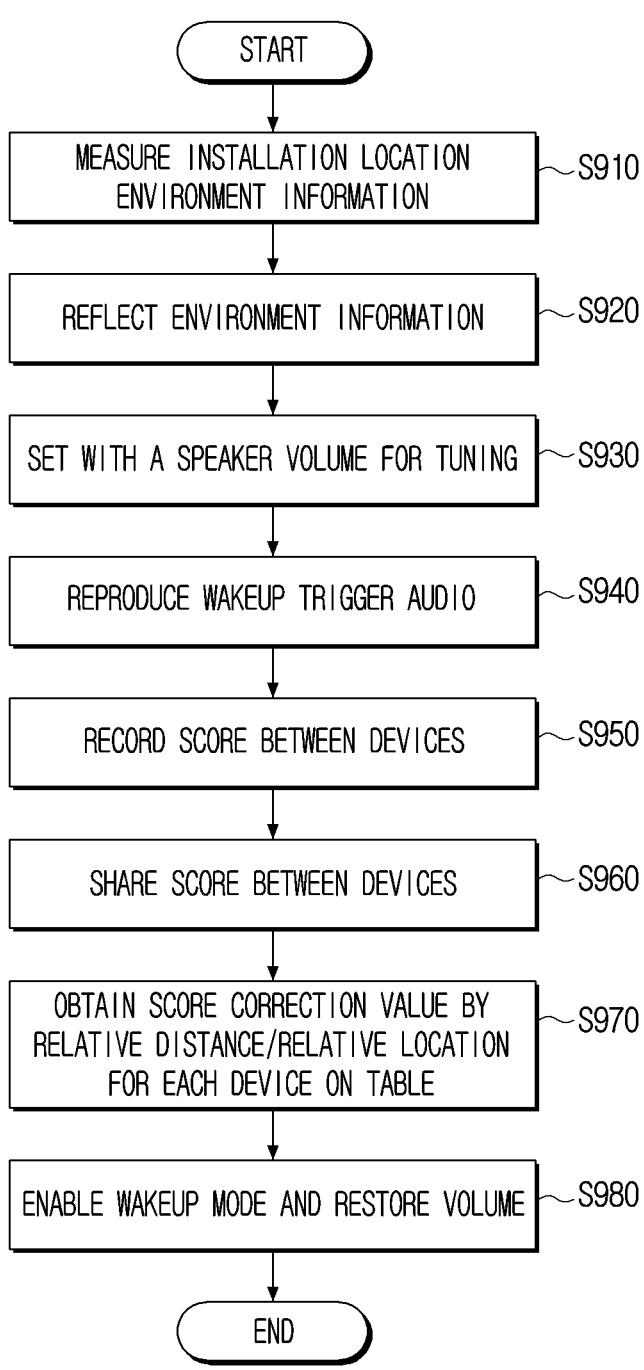

START

MEASURE INSTALLATION LOCATION ENVIRONMENT INFORMATION ~S910

REFLECT ENVIRONMENT INFORMATION ~S920

SET WITH A SPEAKER VOLUME FOR TUNING ~S930

REPRODUCE WAKEUP TRIGGER AUDIO ~S940

RECORD SCORE BETWEEN DEVICES ~S950

SHARE SCORE BETWEEN DEVICES ~S960

OBTAIN SCORE CORRECTION VALUE BY RELATIVE DISTANCE/RELATIVE LOCATION FOR EACH DEVICE ON TABLE ~S970

ENABLE WAKEUP MODE AND RESTORE VOLUME ~S980

END

FIG. 10
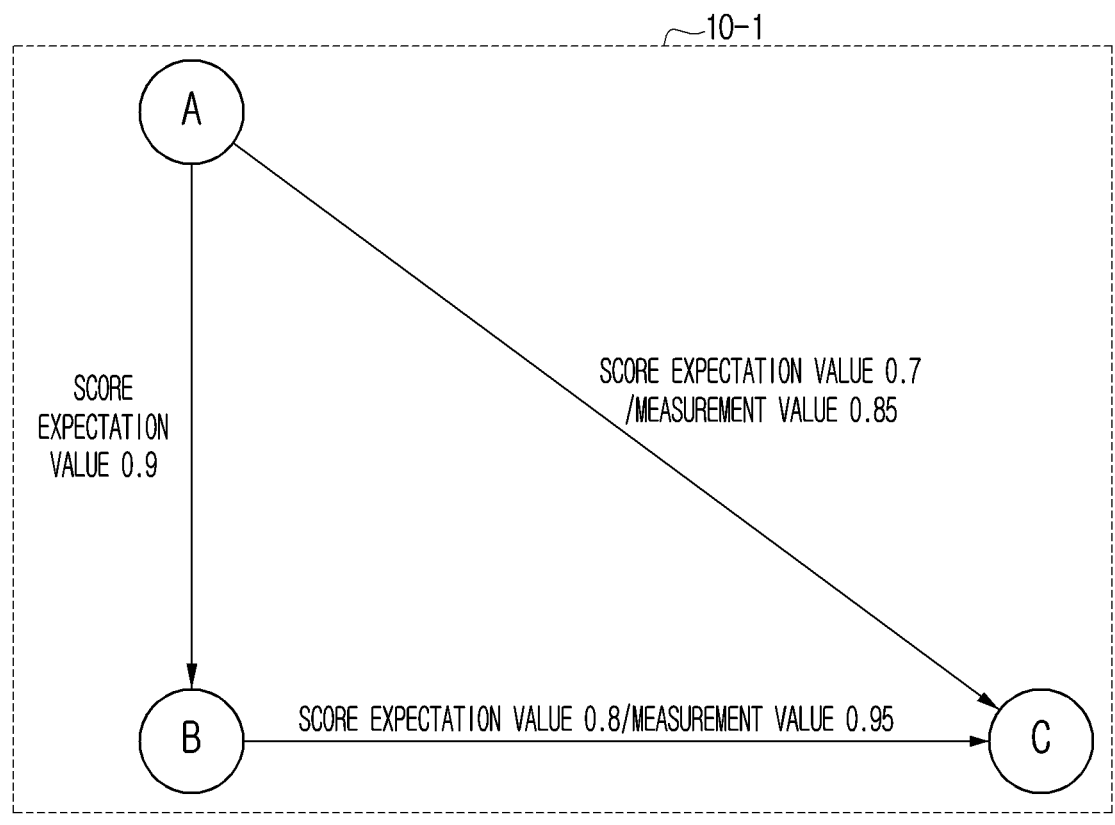
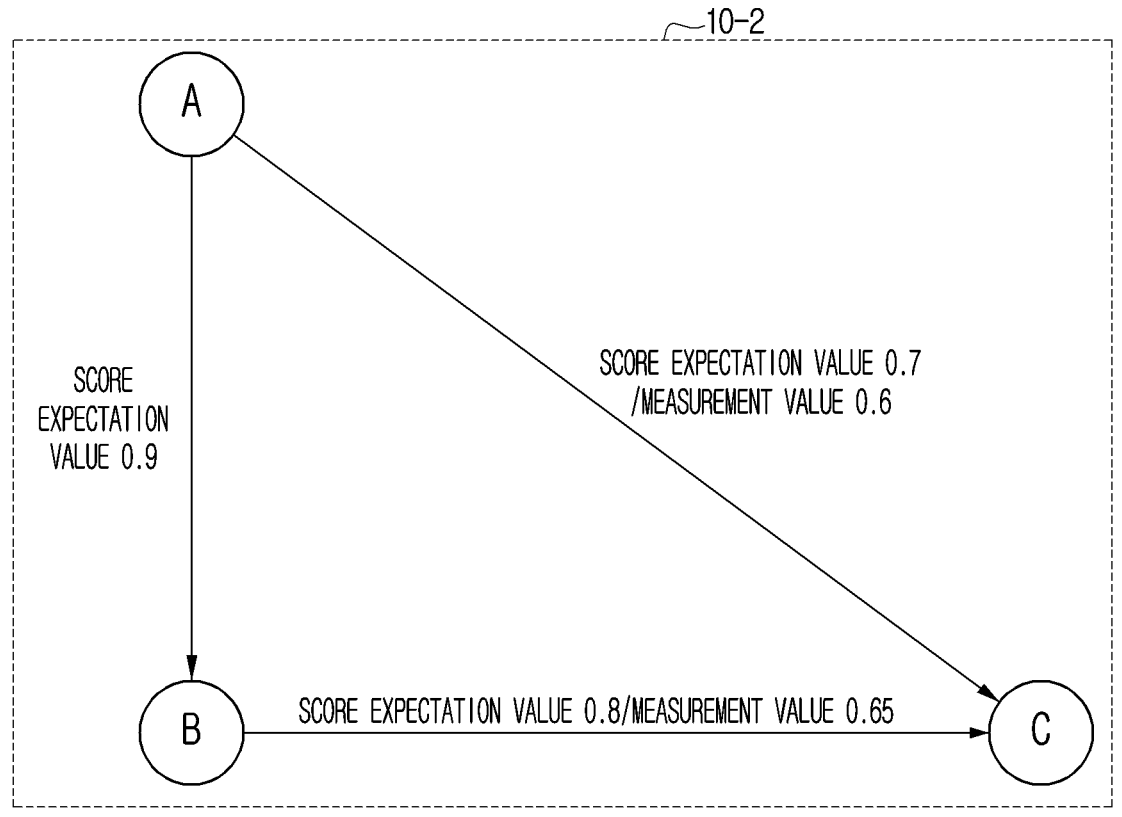

FIG. 11
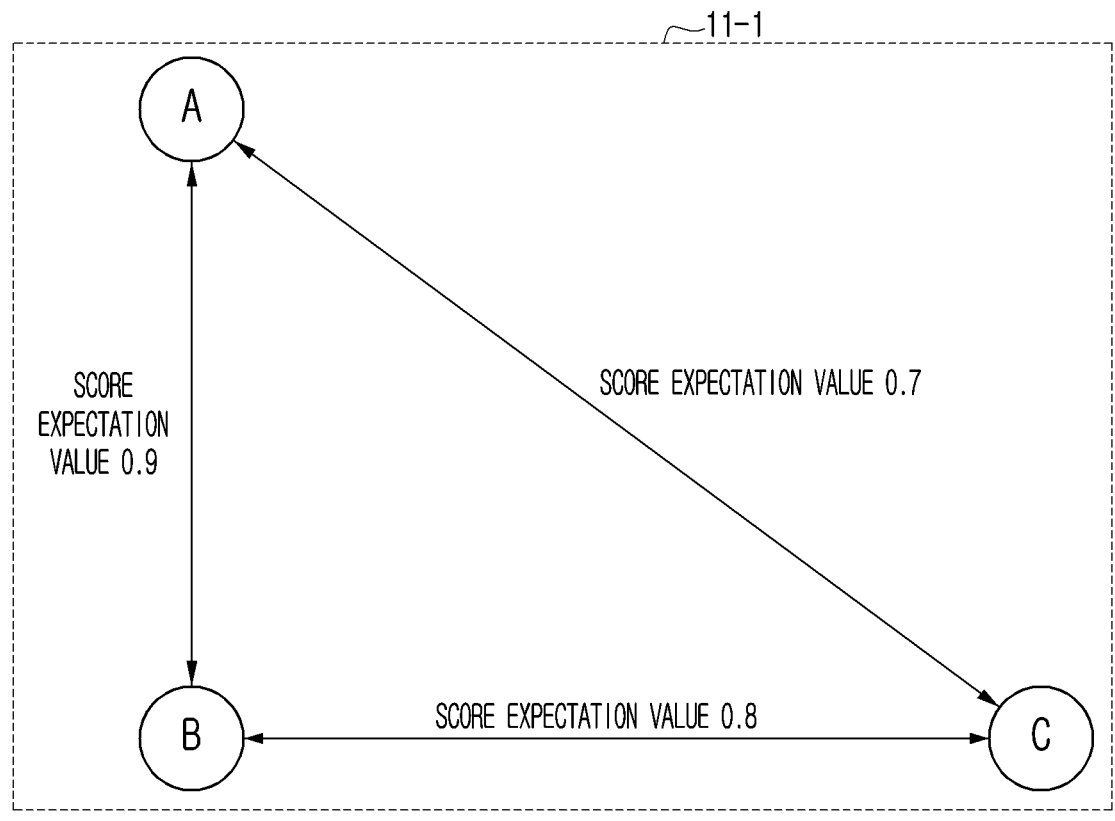
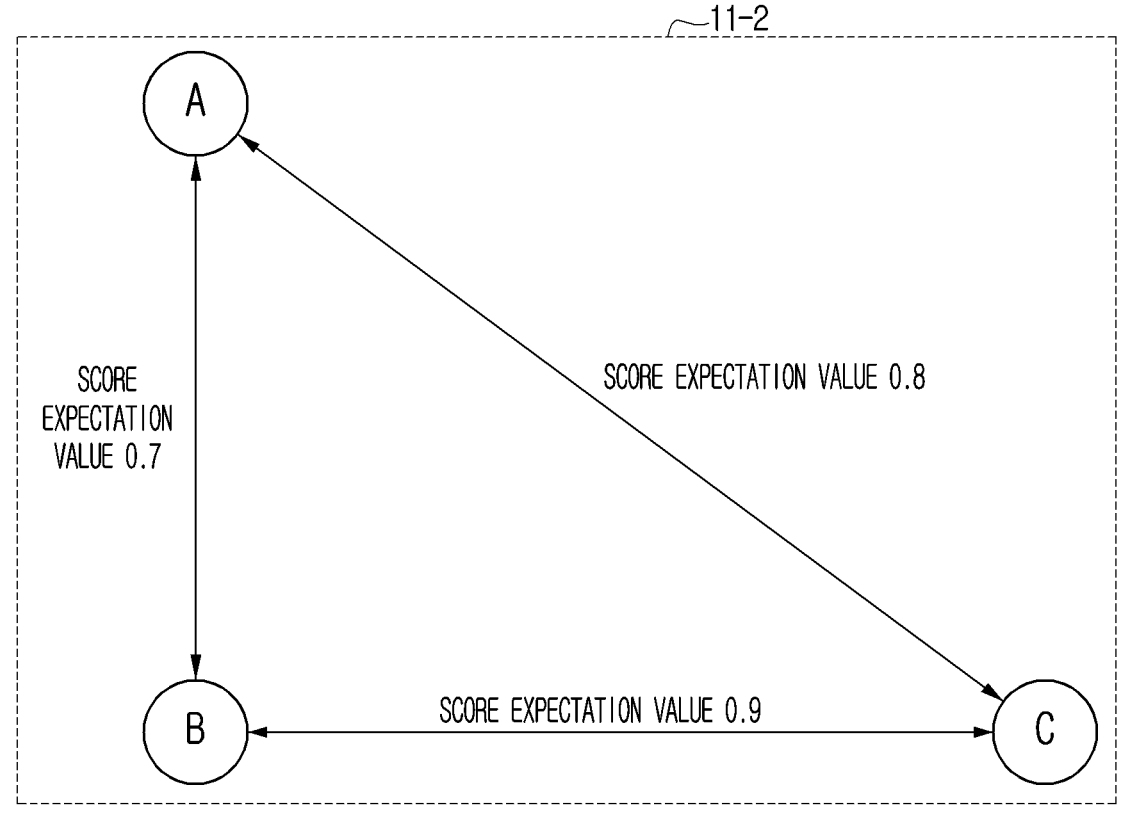

FIG. 18
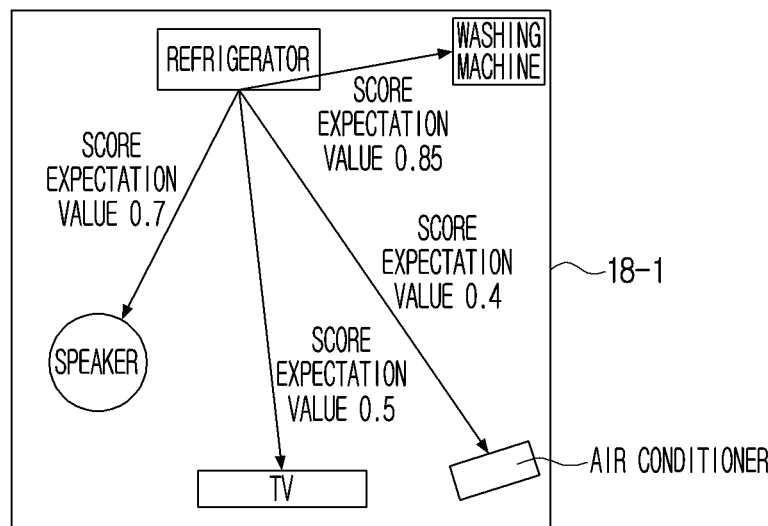
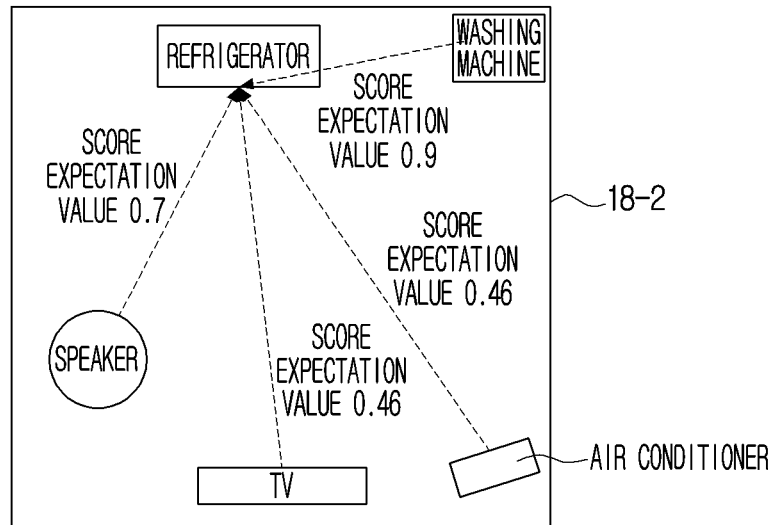
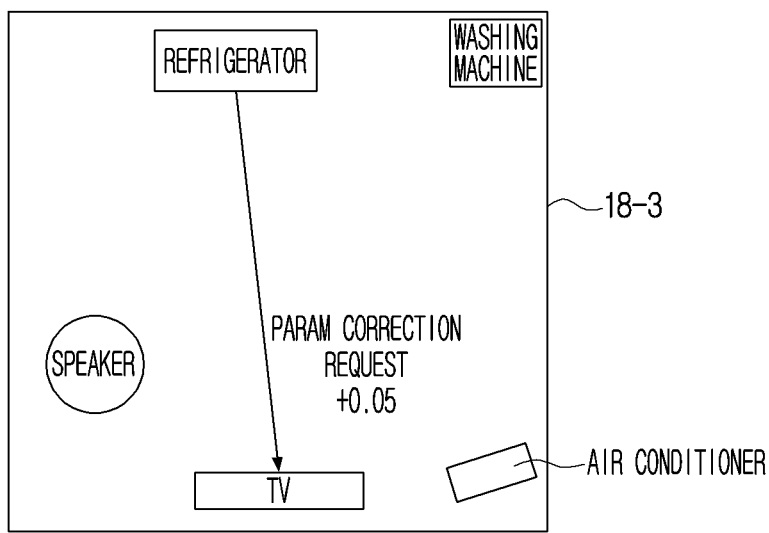

ELECTRONIC APPARATUS AND CONTROL METHOD THEREOF

CROSS-REFERENCE RELATED APPLICATION

This application is a continuation application, based on and claims priority under 35 USC § 111(a), of International Application No. PCT/KR2022/009640, filed on Jul. 5, 2022, which claims priority to U. S. C. § 119 to Korean Patent Application No. 10-2021-0133414 filed on Oct. 7, 2021, the disclosures of which are incorporated herein by reference in their entireties.

BACKGROUND

1. Field

The disclosure relates to an electronic apparatus and a control method thereof and more particularly relates to an electronic apparatus which performs speech recognition and a control method thereof.

2. Description of Related Art

Along with the development of electronic technologies, various types of devices are developed and distributed and interactions between a plurality of electronic apparatuses are variously performed.

Particularly, recently, a plurality of electronic apparatuses are able to control speech according to the development of speech recognition technology, however there is a problem in specifying which electronic apparatus among the plurality of electronic apparatus is to process a wakeup command of a user.

In a case of the same platform, one electronic apparatus may be specified among the plurality of electronic apparatus through a multi device wakeup (MDW) technology. In a case of the multi device wakeup technology, it is assumed that an apparatus closest to an utterance location is woken up.

For example, as illustrated in FIG. 1, even if a user speaks a wakeup command at a location 2 in a direction to TV, a speaker needs to be woken up according to the multi device wakeup technology.

Herein, since each of the plurality of electronic apparatuses has different characteristics in terms of hardware, measurement values such as a magnitude of a sound (amplitude, sound level, or the like[, a signal-to-noise ratio (SNR), articulation, and the like are not compared as they are, but values corrected using various parameters are compared. At that time, the parameters used in the correction are ensured in a limited environment, and the limited environment may refer to a state of one space, the same environment noise, a limited obstacle, limited arrangement, or the like.

Therefore, an error may occur due to the actual installation environment and arrangement, and values ensured in the limited environment are fixed and unlikely to be corrected after actual installation.

SUMMARY

The disclosure is made in view of the above needs and an object of the disclosure is to provide an electronic apparatus which obtains a correction value for a measurement value of a sound by reflecting an installation environment and a control method thereof.

According to an embodiment of the disclosure to achieve the above object, there is provided an electronic apparatus including a communication interface, a microphone, and a processor configured to be connected to the communication interface and the microphone to control the electronic apparatus, in which the processor is configured to obtain a first expectation value for a first sound to be output from a first external electronic apparatus and a second expectation value for a second sound to be output from a second external electronic apparatus, control the communication interface to transmit a first sound output request signal to the first external electronic apparatus to request the first sound to be output by the first external electronic apparatus, based on the first sound being output from the first external electronic apparatus in response to the transmitted first sound output request signal, obtain a first measurement value for the first sound received through the microphone, control the communication interface to transmit a second sound output request signal to the second external electronic apparatus to request the second sound to be output by the second external electronic apparatus, based on the second sound being output from the second external electronic apparatus in response to the transmitted second sound output request signal, obtain a second measurement value for the second sound received through the microphone, and obtain a correction value for one or more of the first measurement value of the first sound and the second measurement value of the second sound obtained through the microphone based on the obtained first measurement value, the obtained second measurement value, the obtained first expectation value, and the obtained second expectation value.

The processor may be configured to, based on the obtained first measurement value being more than the obtained first expectation value and the obtained second measurement value being more than the obtained second expectation value, obtain a negative correction value for reducing the one or more of the first measurement value and the second measurement value, and based on the obtained first measurement value being less than the obtained first expectation value and the obtained second measurement value being less than the obtained second expectation value, obtain a positive correction value for increasing the measurement value.

The processor may be configured to, based on the obtained first measurement value being not within a first threshold range based on the obtained first expectation value and the obtained second measurement value being within a second threshold range based on the obtained second expectation value, obtain a correction value for a measurement value of a sound output at a location within a threshold range based on a location corresponding to the first location information based on a change of an apparatus which operates according to a wakeup command.

The processor may be configured to, based on the apparatus which operates according to the wakeup command being changed, obtain the correction value so that the apparatus which operates is restored, and based on the apparatus which operates according to the wakeup command being not changed, obtain the correction value as 0 or obtain the correction value within a range in which the apparatus which operates is not changed.

The processor may be configured to receive a third measurement value for the second sound measured by the first external electronic apparatus and a third expectation value which is a predicted measurement value of the second sound by the first external electronic apparatus based on the second location information from the first external electronic apparatus through the communication interface, and obtain the correction value for the measurement value of the sound obtained through the microphone based on the obtained first measurement value, the obtained second measurement value, the received third measurement value, the obtained first expectation value, the second expectation value, and the received third expectation value.

The processor may be configured to, based on the first measurement value being not within a first threshold range based on the obtained first expectation value, the obtained second measurement value being not within a second threshold range based on the obtained second expectation value, and the received third measurement value being within a third threshold range based on the received third expectation value, obtain the correction value for the measurement value of the sound obtained through the microphone.

The processor may be configured to, based on the obtained first measurement value being not within a first threshold range based on the obtained first expectation value, the obtained second measurement value being within a second threshold range based on the obtained second expectation value, and the received third measurement value being within a third threshold range based on the received third expectation value, obtain a correction value for a measurement value of a sound output at a location within a threshold range based on a location corresponding to the first location information based on a change of an apparatus which operates according to a wakeup command.

The processor may be configured to, based on the apparatus which operates according to the wakeup command being changed, obtain the correction value so that the apparatus which operates is restored, and based on the apparatus which operates according to the wakeup command being not changed, obtain the correction value as 0 or obtain the correction value within a range in which the apparatus which operates is not changed.

The processor may be configured to control the communication interface to transmit a signal for requesting the third measurement value and the third expectation value based on hardware performance of the first external electronic apparatus to the first external electronic apparatus.

The processor may be configured to control the communication interface to transmit the first expectation value request signal for the first external electronic apparatus and the second expectation value request signal for the second external electronic apparatus to an external server, and receive the first expectation value and the second expectation value from the external server through the communication interface.

The electronic apparatus may further include a memory configured to store first information for the first expectation value based on a distance between the electronic apparatus and the first external electronic apparatus and second information for the second expectation value based on a distance between the electronic apparatus and the second external electronic apparatus, and the processor may be configured to control the communication interface to transmit a request signal for the first location information and the second location information to an external server, receive the first location information and the second location information from the external server through the communication interface, and obtain the first expectation value corresponding to the first location information based on the first information and the second expectation value corresponding to the second location information based on the second information.

The processor may be configured to obtain a plurality of fourth expectation values for a third sound output from a third external electronic apparatus at a plurality of locations, control the communication interface to transmit a third sound output request signal at the plurality of locations to the third external electronic apparatus to request the third sound to be output by the third external electronic apparatus, based on the third sound being output by the third external electronic apparatus at each of the plurality of locations in response to the transmitted third sound output request signal, obtain a plurality of fourth measurement values for the third sound at each of the plurality of locations through the microphone, and obtain a correction value for a sound measured through the microphone based on the obtained first measurement value, the obtained second measurement value, the obtained plurality of fourth measurement values, the obtained first expectation value, the obtained second expectation value, and the obtained plurality of fourth expectation values, the third external electronic apparatus may be a movable apparatus so that a location of the third external electronic apparatus is changeable, and the plurality of fourth expectation values may be predicted measurement values of the third sound to be output by the electronic apparatus at the plurality of locations.

The processor may be configured to, based on a wakeup command being received, obtain a measurement value of the electronic apparatus for the wakeup command through the microphone, correct the measurement value based on the correction value, receive a corrected measurement value of the first external electronic apparatus for the wakeup command from the first external electronic apparatus and receive a corrected measurement value of the second external electronic apparatus for the wakeup command from the second external electronic apparatus through the communication interface, and based on the corrected measurement value being more than the corrected measurement value of the first external electronic apparatus and the corrected measurement value of the second external electronic apparatus, wake up the electronic apparatus based on the wakeup command.

The first expectation value is a predicted measurement value of the first sound to be output by the electronic apparatus based on first location information of the first external electronic apparatus, and the second expectation value is a predicted measurement value of the second sound to be output by the electronic apparatus based on second location information of the second external electronic apparatus.

According to another embodiment of the disclosure, there is provided a method for controlling an electronic apparatus, the method including obtaining a first expectation value for a first sound output to be output from a first external electronic apparatus and a second expectation value for a second sound output to be output from a second external electronic apparatus, transmitting a first sound output request signal to the first external electronic apparatus to request the first sound to be output by the first external electronic apparatus, based on the first sound being output from the first external electronic apparatus in response to the transmitted first sound output request signal, obtaining a first measurement value for the first sound received through a microphone included in the electronic apparatus, transmitting a second sound output request signal to the second external electronic apparatus to request the second sound to be output by the second external electronic apparatus, based on the second sound being output from the second external electronic apparatus in response to the transmitted second sound output request signal, obtaining a second measurement value for the second sound received through the microphone, and obtaining a correction value for one or more of the first measurement value of the received first sound and the obtained second measurement value of the received second sound obtained through the microphone based on the obtained first measurement value, the obtained second measurement value, the obtained first expectation value, and the obtained second expectation value, the first expectation value is a predicted measurement value of the first sound by the electronic apparatus based on first location information of the first external electronic apparatus, and the second expectation value is a predicted measurement value of the second sound by the electronic apparatus based on second location information of the second external electronic apparatus.

The obtaining the correction value may include, based on the obtained first measurement value being more than the obtained first expectation value and the obtained second measurement value being more than the obtained second expectation value, obtaining a negative correction value for reducing the one or more of the first measurement value and the second measurement value, and based on the obtained first measurement value being less than the obtained first expectation value and the obtained second measurement value being less than the obtained second expectation value, obtaining a positive correction value for increasing the one or more of the first measurement value and the second measurement value.

The obtaining the correction value may include, based on the obtained first measurement value being not within a first threshold range based on the obtained first expectation value and the obtained second measurement value being within a second threshold range based on the obtained second expectation value, obtaining a correction value for a measurement value of a sound output at a location within a threshold range based on a location corresponding to the first location information based on a change of an apparatus which operates according to a wakeup command.

The obtaining the correction value may include, based on the apparatus which operates according to the wakeup command being changed, obtaining the correction value so that the apparatus which operates is restored, and based on the apparatus which operates according to the wakeup command being not changed, obtaining the correction value as 0 or obtaining the correction value within a range in which the apparatus which operates is not changed.

The control method may further include receiving a third measurement value for the second sound measured by the first external electronic apparatus and a third expectation value which is a predicted measurement value of the second sound by the first external electronic apparatus based on the second location information from the first external electronic apparatus, and the obtaining the correction value may include obtaining the correction value for the measurement value of the sound obtained through the microphone based on the obtained first measurement value, the obtained second measurement value, the obtained third measurement value, the obtained first expectation value, the obtained second expectation value, and the obtained third expectation value.

The obtaining the correction value may include, based on the first measurement value being not within a first threshold range based on the obtained first expectation value, the obtained second measurement value being not within a second threshold range based on the obtained second expectation value, and the obtained third measurement value being within a third threshold range based on the obtained third expectation value, obtaining the correction value for the measurement value of the sound obtained through the microphone.

The obtaining the correction value may include, based on the obtained first measurement value being not within a first threshold range based on the obtained first expectation value, the obtained second measurement value being within a second threshold range based on the obtained second expectation value, and the obtained third measurement value being within a third threshold range based on the obtained third expectation value, obtaining a correction value for a measurement value of a sound output at a location within a threshold range based on a location corresponding to the first location information based on a change of an apparatus which operates according to a wakeup command.

According to various embodiments of the disclosure described above, the electronic apparatus may correct the measurement value of the sound obtained by the electronic apparatus by reflecting the installation environment and the measurement value of the sound between the plurality of surrounding apparatuses, and determine the operation based on the corrected measurement value, thereby improving an accuracy of the operation.

In addition, the electronic apparatus may perform the correction operation according to an event in which a new surrounding apparatus is added or the like to increase the accuracy of the operation periodically.

BRIEF DESCRIPTION OF THE DRAWINGS

FIG. 7 is a diagram illustrating information of a plurality of external electronic apparatuses according to an embodiment.

FIG. 9 is a flowchart illustrating a method for obtaining a correction value according to an embodiment.

FIG. 10 is a diagram illustrating a method for obtaining a correction value according to an embodiment.

FIG. 11 is a diagram illustrating an operation of additionally considering data between external apparatuses according to an embodiment.

FIG. 18 is a diagram illustrating a specific method for obtaining correction values of a plurality of external electronic apparatuses by the electronic apparatus according to an embodiment.

DETAILED DESCRIPTION

Figure 1:
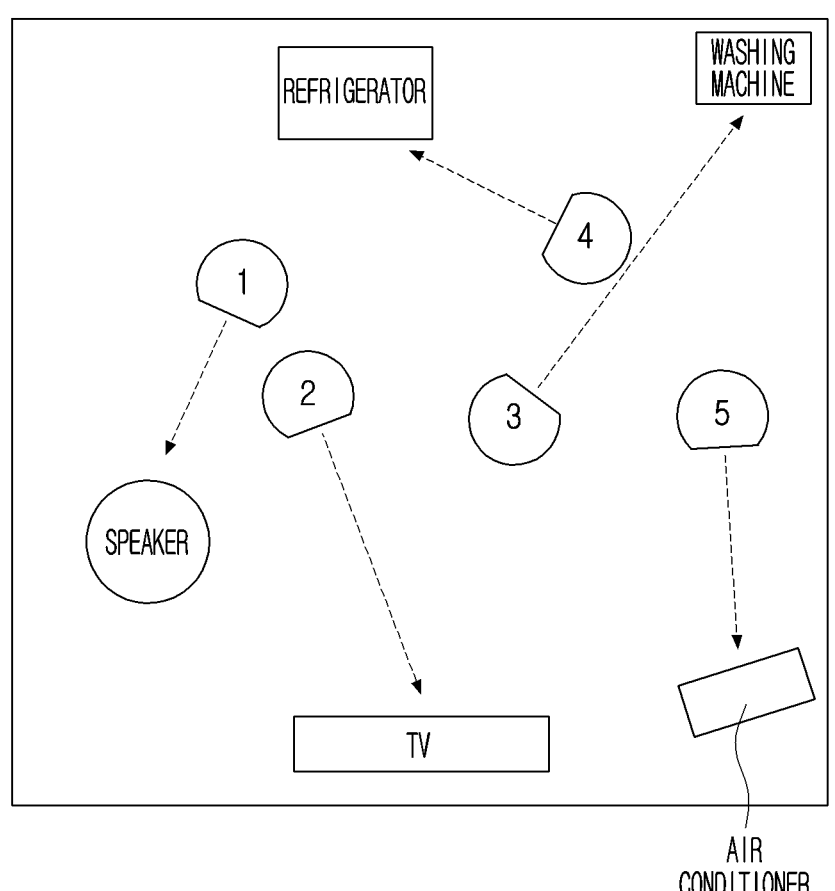
FIG. 1 is a diagram illustrating multi device wakeup according to an embodiment.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

Hereinafter, the disclosure will be described in detail with reference to the accompanying drawings.

The terms used in embodiments of the disclosure have been selected as widely used general terms as possible in consideration of functions in the disclosure, but these may vary in accordance with the intention of those skilled in the art, the precedent, the emergence of new technologies and the like. In addition, in a certain case, there may also be an arbitrarily selected term, in which case the meaning will be described in the description of the disclosure. Therefore, the terms used in the disclosure should be defined based on the meanings of the terms themselves and the contents throughout the disclosure, rather than the simple names of the terms.

In this disclosure, the terms such as "comprise", "may comprise", "consist of", or "may consist of" are used herein to designate a presence of corresponding features (e.g., constituent elements such as number, function, operation, or part), and not to preclude a presence of additional features.

It should be understood that the expression such as "at least one of A or/and B" expresses any one of "A", "B", or "at least one of A and B".

The expressions "first," "second" and the like used in the disclosure may denote various elements, regardless of order and/or importance, and may be used to distinguish one element from another, and does not limit the elements.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

In this disclosure, a term "user" may refer to a person using an electronic apparatus or an apparatus using an electronic apparatus (e.g., an artificial intelligence electronic apparatus).

Hereinafter, an embodiment of the disclosure will be described in more detail with reference to the accompanying drawings.

Figure 2:
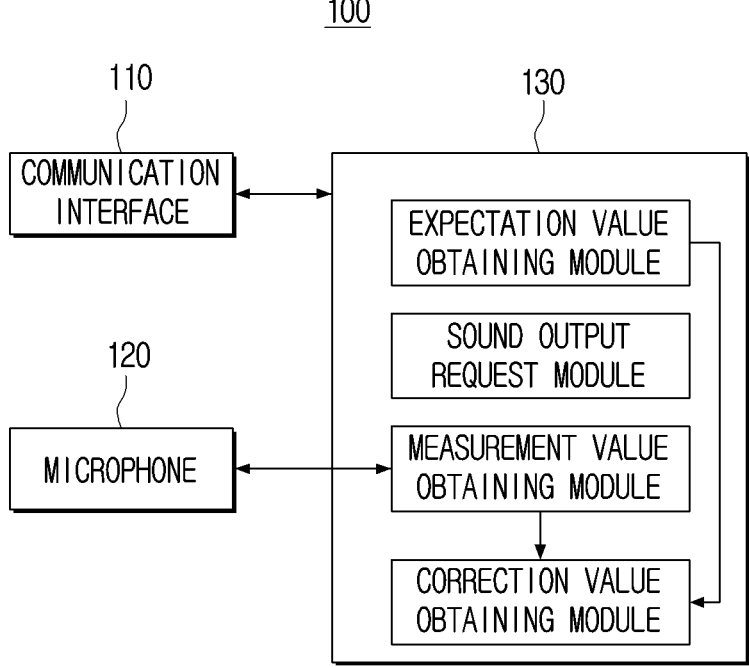
FIG. 2 is a block diagram illustrating a hardware configuration of an electronic apparatus according to an embodiment.

FIG. 2 is a block diagram illustrating a hardware configuration of an electronic apparatus 100 according to an embodiment.

The electronic apparatus 100 may be an apparatus which performs speech recognition and natural language understanding for a user speech signal, and specifically, may be an apparatus which includes a microphone and performs speech recognition and natural language understanding for a user speech signal received through the microphone, such as a smartphone, a tablet PC, a desktop PC, a notebook, a smart watch, a set-top box (STB), a speaker, a main computer, or the like.

Alternatively, the electronic apparatus 100 may be an apparatus which does not include a microphone such as a TV, a video wall, a large format display (LFD), a digital signage, a digital information display (DID), a projector display, a digital video disk (DVD) player, a monitor, smart glasses, or the like, receives a user speech signal through wired or wireless communication from anexternal electronic apparatus such as a remote control device, and performs speech recognition and natural language understanding for the user speech signal received Alternatively, the electronic apparatus 100 may be an apparatus which receives a user speech signal through a microphone, transmits the received user speech signal to a server, and receives a result of speech recognition and natural language understanding for the user speech signal from the server.

However, the electronic apparatus is not limited thereto, and the electronic apparatus 100 may be any apparatus, as long as it is able to receive a user speech signal.

Referring to FIG. 2, the electronic apparatus 100 may include a communication interface 110, a microphone 120, and a processor 130. However, the electronic apparatus is not limited thereto, and the electronic apparatus 100 may be implemented without some constituent elements.

The communication interface 110 is a constituent element which performs communication with various types of external apparatuses according to various types of communication methods. For example, the display apparatus 100 may receive a sound measurement value from an external apparatus through the communication interface 110.

The communication interface 110 may include a Wi-Fi module, a Bluetooth module, an infrared communication module, and a wireless communication module. Herein, each communication module may be implemented in a form of at least one hardware chip.

The Wi-Fi module and the Bluetooth module may communicate by a Wi-Fi method and a Bluetooth method, respectively. In a case of using the Wi-Fi module or the Bluetooth module, various pieces of connection information such as Service Set Identifier (SSID) or session key may be transmitted or received first to allow the communication connection by using these, and then various pieces of information may be transmitted and received. The infrared communication module may perform communication according to a technology of infrared communication (infrared Data Association (IrDA)) for transmitting data in a close range wirelessly by using infrared rays between visible rays and millimeter waves.

The wireless communication module may include at least one communication chip for performing communication according to various wireless communication standard such as zigbee, 3rd Generation (3G), 3rd Generation Partnership Project (3GPP), Long Term Evolution (LTE), LTE Advanced (LTE-A), 4th Generation (4G), 5th Generation (5G), and the like, in addition to the above communication method.

The communication interface 110 may include a wired communication interface such as HDMI, DP, Thunderbolt, USB, RGB, D-SUB, DVI, or the like.

In addition, the communication interface 110 may include at least one of wired communication modules for performing communication by using a local area network (LAN) module, an Ethernet module, pair cables, a coaxial cable, or an optical fiber cable.

The microphone 120 is a constituent element which receives an input of a sound and converts the sound into an audio signal. The microphone 120 may be electrically connected to the processor 130 and receive a sound by a control of the processor 130. Herein, the sound may include a sound generated from the electronic apparatus 100 and at least one of external electronic apparatuses around the electronic apparatus 100, and a noise around the electronic apparatus 100.

For example, the microphone 120 may be formed as an integrated type that is integrated on an upper side, a front surface, or a side surface of the electronic apparatus 100. Alternatively, the microphone 120 may be provided in a remote control separated from the electronic apparatus 100. In this case, the remote control may receive a sound through the microphone 120 and provide the received sound to the electronic apparatus 100.

The microphone 120 may include various constituent elements such as a microphone for collecting a sound in an analogue form, an amplification circuit for amplifying the collected sound, an A/D conversion circuit for sampling the amplified sound and converting the sound into a digital signal, a filter circuit for removing a noise component from the converted digital signal, and the like.

In addition, the microphone 120 may be provided in plurality. In this case, the processor 130 may analyze a sound input from a plurality of microphones and identify a location where the sound is output.

Meanwhile, the microphone 120 may be implemented in a form of a sound sensor and any configuration may be used as long as it is a configuration for collecting a sound.

The processor 130 may generally control the operation of the electronic apparatus 100. Specifically, the processor 130 may be connected to each constituent element of the electronic apparatus 100 to generally control the operation of the electronic apparatus 100. For example, the processor 130 may be connected to constituent elements such as the communication interface 110, the microphone 120, the memory (not illustrated), and the display (not illustrated) to control the operation of the electronic apparatus 100.

According to an embodiment, the processor 130 may be implemented as a digital signal processor (DSP), a microprocessor, or a time controller (TCON). However, there is no limitation thereto, and the processor 130 may include one or more of a central processing unit (CPU), a microcontroller unit (MCU), a microprocessing unit (MPU), a controller, an application processor (AP), or a communication processor (CP), and an ARM processor or may be defined as the corresponding term. In addition, the processor 130 may be implemented as System on Chip (SoC) or large scale integration (LSI) including the processing algorithm or may be implemented in form of a field programmable gate array (FPGA).

Referring to FIG. 2, the location of a plurality of modules in the processor 130 is for representing a state in which the plurality of modules are loaded (or executed) by the processor 130 and operated in the processor 130, and the plurality of modules may be stored in the memory in advance.

In addition, the processor 130 may control general operations of the electronic apparatus 100 by executing modules or instructions stored in the memory. Specifically, the processor 130 may determine a sequence for data processing by reading and analyzing modules or instructions and may control operations of other constituent elements by transmitting a control signal for controlling operations of the other constituent elements such as the memory.

The processor 130 may obtain a first expectation value for a first sound received from a first external electronic apparatus and a second expectation value for a second sound received from a second external electronic apparatus by executing an expectation value obtaining module. Herein, the first expectation value may be a predicted measurement value of the first sound received from the electronic apparatus 100 based on first location information of the first external electronic apparatus, the second expectation value may be a predicted measurement value of the second sound received from the electronic apparatus 100 based on second location information of the second external electronic apparatus, and these may be predetermined values in a limited environment.

The processor 130 may control the communication interface 110 to transmit an expectation value request signal for the first external electronic apparatus and the second external electronic apparatus to an external server, and receive the first expectation value and the second expectation value from the external server through the communication interface 110.

In this case, the external server may store location information of each of the electronic apparatus 100, the first external electronic apparatus, and the second external electronic apparatus. In addition, the external server may store information on the first expectation value according to a distance between the electronic apparatus 100 and the first external electronic apparatus and information on the second expectation value according to a distance between the electronic apparatus 100 and the second external electronic apparatus. For example, the information on the first expectation value may include information such as a first expectation value 1 in a case where the distance between the electronic apparatus 100 and the first external electronic apparatus is 1 m, a first expectation value 2 in a case where the distance between the electronic apparatus 100 and the first external electronic apparatus is 2 m, and the like. The information on the second expectation value may include information in a similar form as that of the information on the first expectation value. However, there is no limitation thereto, and the information on the first expectation value may be information in a function form for converting the distance between the electronic apparatus 100 and the first external electronic apparatus into a variable. The information on the second expectation value may also be information in a function form for converting the distance between the electronic apparatus 100 and the second external electronic apparatus into a variable.

The external server may identify the first expectation value corresponding to the distance between the electronic apparatus 100 and the first external electronic apparatus and the second expectation value corresponding to the distance between the electronic apparatus 100 and the second external electronic apparatus, and provide the identified first expectation value and the identified second expectation value to the electronic apparatus 100.

In addition, the electronic apparatus 100 may further include a memory storing first information for the first expectation value based on the distance between the electronic apparatus 100 and the first external electronic apparatus and second information for the second expectation value based on the distance between the electronic apparatus 100 and the second external electronic apparatus. Here, the memory may refer to hardware storing the information such as data electrically or magnetically so that the processor 130 and the like are able to access. For this, the memory be implemented as at least one hardware of a non-volatile memory, a volatile memory, a flash memory, a hard disk drive (HDD) or a solid state drive (SSD), a RAM, a ROM, or the like.

In this case, the processor 130 may control the communication interface 110 to transmit a request signal for the first location information and the second location information to the external server, receive the first location information and the second location information from the external server through the communication interface 110, and obtain the first expectation value corresponding to the first location information based on the first information and the second expectation value corresponding to the second location information based on the second information.

The processor 130 may control the communication interface 110 to transmit a first sound output request signal to the first external electronic apparatus by executing a sound output request module. Herein, the first sound output request signal may include a signal for controlling the first external electronic apparatus. For example, the first sound output request signal may include a signal for controlling the first external electronic apparatus to receive the first sound output request signal and immediately output the first sound.

In addition, the processor 130 may control the communication interface 110 to transmit the first sound output request signal and, when a first measurement value for the first sound output from the first external electronic apparatus is obtained, transmit a second sound output request signal to the second external electronic apparatus by executing the sound output request module. Herein, the second sound output request signal may include a signal for controlling the second external electronic apparatus. For example, the second sound output request signal may include a signal for controlling the second external electronic apparatus to receive the second sound output request signal and immediately output the second sound.

However, there is no limitation thereto, and the processor 130 may control the communication interface 110 to transmit one sound output request signal to the first external electronic apparatus and the second external electronic apparatus. Herein, the sound output request signal may include a signal for controlling the first external electronic apparatus and the second external electronic apparatus differently. For example, the sound output request signal may include a first signal for controlling the first external electronic apparatus to receive the first sound output request signal and immediately output the first sound and a second signal for controlling the second external electronic apparatus to receive the first sound output request signal and output the sound three minutes later.

In addition, the sound output request signal may be implemented in various methods. For example, the sound output request signal may include the first signal for controlling the first external electronic apparatus to receive the first sound output request signal and immediately output the sound and the second signal for controlling the second external electronic apparatus to receive the first sound output request signal and output the second sound, when the first sound output from the first external electronic apparatus is received.

By executing a measurement value obtaining module, when the first sound is output from the first external electronic apparatus based on the first sound output request signal, the processor 130 may obtain a first measurement value for the first sound through the microphone and obtain a second measurement value for the second sound through the microphone 120, when the second sound is output from the second external electronic apparatus. As described above, time points when the first sound and the second sound are output may be different.

The processor 130, by executing a correction value obtaining module, may obtain a correction value for a measurement value of a sound obtained through the microphone 120 based on the first measurement value, the second measurement value, the first expectation value, and the second expectation value.

When the first measurement value is more than the first expectation value and the second measurement value is more than the second expectation value, the processor 130 may obtain a negative correction value for the measurement value of the sound obtained through the microphone 120. For example, if the electronic apparatus 100 is installed in a narrow space, wall paper or flooring is formed of a material that easily reflects a sound, or a sound is reflected due to low ceiling, the first measurement value and the second measurement value may be more than the first expectation value and the second expectation value, respectively, and in this case, the processor 130 may obtain the negative correction value for reducing the measurement value of the sound obtained through the microphone 120.

In addition, when the first measurement value is less than the first expectation value and the second measurement value is less than the second expectation value, the processor 130 may obtain a positive correction value for the measurement value of the sound obtained through the microphone 120. For example, if the electronic apparatus 100 is installed in a wide space or the curtain and the like have sound-absorbing materials, the first measurement value and the second measurement value may be less than the first expectation value and the second expectation value, respectively, and in this case, the processor 130 may obtain the positive correction value for increasing the measurement value of the sound obtained through the microphone 120.

Meanwhile, when the first measurement value is not within a first threshold range based on the first expectation value and the second measurement value is within a second threshold range based on the second expectation value, the processor 130 may obtain a correction value for the measurement value of the sound output at a location within a threshold range based on a location corresponding to the first location information.

For example, when an obstacle exists between the electronic apparatus 100 and the first external electronic apparatus, the first measurement value may be less than the first expectation value, but when an obstacle does not exist between the electronic apparatus 100 and the second external electronic apparatus, the second measurement value may be within the second threshold range based on the second expectation value. In this case, the processor 130 may obtain the correction value for the measurement value of the sound output at the location within the threshold range from the location of the first external electronic apparatus.

Herein, the processor 130 may obtain a correction value to restore an apparatus to operate, when an apparatus to operate according to a wakeup command is changed, and may obtain a correction value as 0 or obtain a correction value within a range in which the apparatus to operate is not changed, when an apparatus to operate according to a wakeup command is not changed.

For example, when the electronic apparatus 100 is closer to the first external electronic apparatus than the second external electronic apparatus, the measurement value of the electronic apparatus 100 for the first sound output from the first external electronic apparatus needs to be more than the measurement value of the second external electronic apparatus for the first sound and the electronic apparatus 100 needs to be woken up. At that time, the measurement value of the electronic apparatus 100 for the first sound output from the first external electronic apparatus may be less than the measurement value of the second external electronic apparatus for the first sound due to the obstacle, and in this case, the second external electronic apparatus may be woken up rather than the electronic apparatus 100. Accordingly, the processor 130 may obtain the correction value so that the electronic apparatus 100 may woken up. In addition, even if the obstacle exists, the measurement value of the electronic apparatus 100 for the first sound output from the first external electronic apparatus may be more than the measurement value of the second external electronic apparatus for the first sound, and in this case, the electronic apparatus 100 may be woken up. Accordingly, the processor 130 may obtain the correction value as 0 or obtain the correction value within the range in which an apparatus to be woken up is not changed.

Meanwhile, the processor 130 may receive a third measurement value for the second sound measured by the first external electronic apparatus and a third expectation value which is a predicted measurement value of the second sound by the first external electronic apparatus based on the second location information from the first external electronic apparatus through the communication interface 110.

For example, the electronic apparatus 100, the first external electronic apparatus, and the second external electronic apparatus may share the measurement values and the expectation values. In this case, each of the electronic apparatus 100, the first external electronic apparatus, and the second external electronic apparatus may obtain the correction value for the measurement value of the sound obtained through the microphone.

In addition, the processor 130 may control the communication interface 110 to transmit a signal for requesting for the third measurement value and the third expectation value based on hardware performance of the first external electronic apparatus to the first external electronic apparatus, and receive the third measurement value for the second sound measured by the first external electronic apparatus and the third expectation value which is a predicted measurement value of the second sound by the first external electronic apparatus based on the second location information from the first external electronic apparatus through the communication interface 110. In this case, the processor 130 may obtain the correction value for the measurement value of the sound obtained from each of the first external electronic apparatus and the second external electronic apparatus, in addition to the electronic apparatus 100, and control the communication interface 110 to transmit the obtained correction value to a corresponding external electronic apparatus.

The processor 130 may obtain the correction value for the measurement value of the sound obtained through the microphone 120 based on the first measurement value, the second measurement value, the third measurement value, the first expectation value, the second expectation value, and the third expectation value.

When the first measurement value is not within the first threshold range based on the first expectation value, the second measurement value is not within the second threshold range based on the second expectation value, and the third measurement value is within a third threshold range based on the third expectation value, the processor 130 may obtain the correction value for the measurement value of the sound obtained through the microphone 120.

In this case, the processor 130 may identify a problem in terms of hardware of the electronic apparatus 100 or a problem of an environment in which the electronic apparatus 100 is arranged, and obtain the correction value for the measurement value of the sound obtained through the microphone 120.

In addition, when the first measurement value is not within the first threshold range based on the first expectation value, the second measurement value is within the second threshold range based on the second expectation value, and the third measurement value is within the third threshold range based on the third expectation value, the processor 130 may obtain the correction value for the measurement value of the sound output at a location within the threshold range based on the location corresponding to the first location information based on the change of the apparatus to operate according to the wakeup command.

For example, when the obstacle exists only between the electronic apparatus 100 and the first external electronic apparatus, the first measurement value may be less than the first expectation value, but the second measurement value may be within the second threshold range based on the second expectation value and the third measurement value may be within the third threshold range based on the third expectation value. In this case, the processor 130 may obtain the correction value for the measurement value of the sound output at a location within the threshold range from the location of the first external electronic apparatus.

Herein, when the apparatus to operate according to the wakeup command is changed, the processor 130 may obtain the correction value to restore the electronic apparatus to operate, and when the apparatus to operate according to the wakeup command is not changed, the processor may obtain the correction value as 0 or obtain the correction value within the range in which the apparatus to operate is not changed.

In addition, when the first measurement value is more than the first expectation value, the second measurement value is more than the second expectation value, and the third measurement value is more than the third expectation value, the processor 130 may identify that a space in which the electronic apparatus 100, the first external electronic apparatus, and the second external electronic apparatus are arranged is very narrow. In this case, there is high possibility that the apparatus to operate according to the wakeup command is not changed, and accordingly, the processor 130 may not obtain the correction value.

However, there is no limitation thereto, and the processor 130 may obtain the correction value for the measurement value of the sound obtained through the microphone 120, and the first external electronic apparatus and the second external electronic apparatus may also obtain the correction value for the measurement value of the sound obtained through each microphone thereof. In other words, all apparatuses may obtain the correction value in a state where the apparatus to operate according to the wakeup command is not changed.

As described above, the processor 130 may obtain the correction value by further considering the third measurement value and the third expectation value, thereby improving accuracy for the correction value through more accurate analysis of surrounding environment and the like of the electronic apparatus 100.

Meanwhile, hereinabove, the configuration of obtaining the correction value based on the first measurement value, the second measurement value, the third measurement value, the first expectation value, the second expectation value, and the third expectation value, but there is not limited thereto. For example, the processor 130 may obtain the correction value based on the first measurement value, the third measurement value, the first expectation value, and the third expectation value. For example, when the first measurement value is less than the first threshold range based on the first expectation value and the third measurement value is within the third threshold range based on the third expectation value, the processor 130 may obtain a positive correction value for the measurement value of the sound obtained through the microphone.

Meanwhile, the processor 130 may obtain a plurality of fourth expectation values for a third sound output from a third external electronic apparatus at a plurality of locations and control the communication interface 110 to transmit a third sound output request signal at the plurality of locations to the third external electronic apparatus. Herein, the third external electronic apparatus may be a movable apparatus and the plurality of fourth expectation values may be predicted measurement values of the third sound by the electronic apparatus at the plurality of locations.

For example, the processor 130 may obtain the plurality of fourth expectation values for the third sound output from a movable robot cleaner from the plurality of locations, and control the communication interface 110 to transmit the third sound output request signal at the plurality of locations to the robot cleaner.

When the third external electronic apparatus outputs the third sound at each of the plurality of locations based on the third sound output request signal, the processor 130 may obtain a plurality of fourth measurement values for the third sound at each of the plurality of locations through the microphone 120.

The processor 130 may obtain the correction value for the sound to be measured through the microphone 120 based on the first measurement value, second measurement value, the plurality of fourth measurement values, the first expectation value, the second expectation value, and the plurality of fourth expectation values.

In other words, the processor 130 may further receive a sound output at an arbitrary location and obtain a correction value thereof, not only the sound output at a fixed location of the first external electronic apparatus or the second external electronic apparatus, and may perform more accurate analysis for the space where the electronic apparatus 100 is arranged.

However, there is no limitation thereto, and the processor 130 may obtain the correction value using only the plurality of fourth measurement values and the plurality of fourth expectation values. In this case, the processor 130 may not perform any communication with the first external electronic apparatus and the second external electronic apparatus, obtain the plurality of fourth expectation values for the third sound output from the third external electronic apparatus at the plurality of locations, control the communication interface 110 to transmit the second sound output request signal at the plurality of locations to the third external electronic apparatus, when the third external electronic apparatus outputs the third sound at each of the plurality of locations based on the second sound output request signal, obtain the plurality of fourth expectation values for the third sound at each of the plurality of locations through the microphone 120, and obtain the correction value for the sound to be measured through the microphone 120 based on the plurality of fourth measurement values and the plurality of fourth expectation values. Herein, the third external electronic apparatus may be a movable apparatus and the plurality of fourth expectation values may be predicted expectation values of the third sound by the electronic apparatus 100 at the plurality of location.

After obtaining the correction value as described above, when the wakeup command is received, the processor 130 may obtain a measurement value of the electronic apparatus 100 for the wakeup command through the microphone 120, correct the measurement value based on a correction value, receive the measurement value of the first external electronic apparatus for the wakeup command from the first external electronic apparatus, receive the measurement value of the second external electronic apparatus for the wakeup command from the second external electronic apparatus through the communication interface 110, and, when the corrected measurement value is more than the measurement value of the first external electronic apparatus and the measurement value of the second external electronic apparatus, wake the electronic apparatus 100 up based on the wakeup command.

As described above, the processor 130 may obtain the correction value according to the surrounding environment of the electronic apparatus 100 and determine the operation based on the corrected measurement value for the wakeup command, thereby performing an operation with a high accuracy, although the electronic apparatus is arranged in an arbitrary environment.

Meanwhile, the correction value obtaining module described above may be implemented as a rule-based model. However, there is no limitation thereto, and the correction value obtaining module may be implemented as a neural network model. For example, the electronic apparatus 100 may further include a memory storing a neural network model for obtaining a correction value, and the processor 130 may obtain the correction value of each apparatus by inputting the measurement values to the neural network model. Herein, the neural network model for obtaining the correction value may be a model which learned a relationship between the expectation values and the measurement values.

The function related to artificial intelligence described above may be operated through the processor 130 and the memory.

The processor 130 may be formed of one or a plurality of processors. The one or the plurality of processors may be a general-purpose processor such as a CPU, an AP, or a digital signal processor (DSP), a graphic dedicated processor such as a GPU or a vision processing unit (VPU), or an artificial intelligence dedicated processor such as an NPU, or the like.

The one or the plurality of processors may perform control to process the input data according to a predefined action rule stored in the memory or an artificial intelligence model. In addition, if the one or the plurality of processors are artificial intelligence dedicated processors, the artificial intelligence dedicated processor may be designed to have a hardware structure specialized in processing of a specific artificial intelligence model. The predefined action rule or the artificial intelligence model is formed through training.

Being formed through training herein may, for example, imply that a predefined action rule or an artificial intelligence model set to perform a desired feature (or object) is formed by training a basic artificial intelligence model using a plurality of pieces of learning data by a learning algorithm. Such training may be performed in a device demonstrating artificial intelligence according to the disclosure or performed by a separate server and/or system. Examples of the learning algorithm include supervised learning, unsupervised learning, semi-supervised learning, or reinforcement learning, but is not limited to these examples.

The artificial intelligence model may include a plurality of neural network layers. The plurality of neural network layers have a plurality of weight values, respectively, and execute neural network processing through a processing result of a previous layer and processing between the plurality of weights. The plurality of weights of the plurality of neural network layers may be optimized by the training result of the artificial intelligence model. For example, the plurality of weights may be updated to reduce or to minimize a loss value or a cost value obtained by the artificial intelligence model during the training process.

The artificial neural network may include deep neural network (DNN), and, for example, include a convolutional neural network (CNN), deep neural network (DNN), recurrent neural network (RNN), restricted Boltzmann machine (RBM), deep belief network (DBN), bidirectional recurrent deep neural network (BRDNN), or deep Q-network, but there is no limitation to these examples.

Meanwhile, only the electronic apparatus 100, the first external electronic apparatus, and the second external electronic apparatus have been described above, but the number of external electronic apparatuses may be various. However, hereinafter, for convenience of description, it is assumed that only the electronic apparatus 100, the first external electronic apparatus, and the second external electronic apparatus are arranged.

Figure 3:
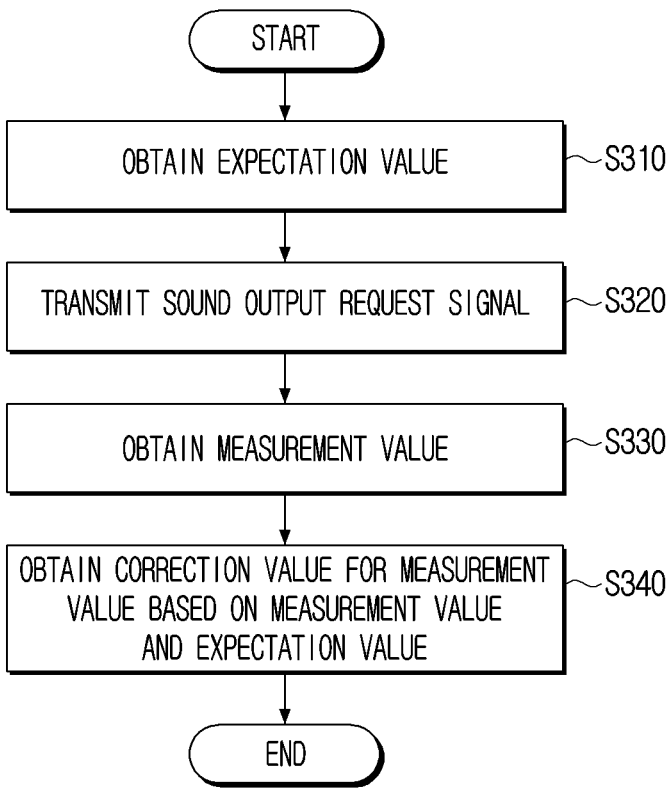
FIG. 3 is a flowchart illustrating a method for obtaining a correction value according to an embodiment.

FIG. 3 is a flowchart illustrating a method for obtaining a correction value according to an embodiment.

First, the processor 130 may obtain the first expectation value for the first sound output from the first external electronic apparatus and the second expectation value for the second sound output from the second external electronic apparatus (S310). In addition, the processor 130 may obtain the third expectation value which is a predicted measurement value of the second sound by the first external electronic apparatus based on the first location information of the first external electronic apparatus and the second location information of the second external electronic apparatus.

The processor 130 may calculate the first expectation value, the second expectation value, and the third expectation value based on the first location information of the first external electronic apparatus and the second location information of the second external electronic apparatus. In this case, the memory may store a mathematical expression for obtaining the expectation values based on the location information.

In addition, the processor 130 may receive the first expectation value, the second expectation value, and the third expectation value from the server.

Further, the electronic apparatus 100 may store the first expectation value, the second expectation value, and the third expectation value in advance.

The processor 130 may transmit the sound output request signal to the first external electronic apparatus and the second external electronic apparatus (S320). For example, when there is a tuning command of a user, the processor 130 may transmit the sound output request signal to the first external electronic apparatus and the second external electronic apparatus. Herein, the tuning command may be a command for instructing to obtain the correction value for the measurement value of the sound obtained through the microphone 120, and when it is determined that an error occurs during a process in which the user gives a speech recognition command, the tuning command may be input to the electronic apparatus 100.

In addition, when an apparatus which is woken up according to the wakeup command of the user is not an apparatus closest to the user, and the number of cases of a command that an apparatus other than the woken-up apparatus is able to perform is a predetermined number of times or more, the processor 130 may transmit the sound output request signal to the first external electronic apparatus and the second external electronic apparatus.

In addition, although the apparatus closest to the user is woken up according to the wakeup command of the user, when the wakeup command is repeatedly input, the processor 130 may transmit the sound output request signal to the first external electronic apparatus and the second external electronic apparatus.

Further, when a new external electronic apparatus is identified, the processor 130 may transmit the sound output request signal to the first external electronic apparatus, the second external electronic apparatus, and the new external electronic apparatus.

Meanwhile, the electronic apparatus 100, the first external electronic apparatus, and the second external electronic apparatus may obtain the measurement value of the sound using an inaudible frequency periodically, and the processor 130 may transmit the sound output request signal to the first external electronic apparatus and the second external electronic apparatus based on the number of times of the case where the prestored measurement value is changed by a threshold value or more. Such an operation is an operation for obtaining the measurement value of the sound periodically and recognizing the change of the arrangement environment without recognition of the user.

When the first sound is output from the first external electronic apparatus, the processor 130 may obtain the first measurement value for the first sound through the microphone 120, and when the second sound is output from the second external electronic apparatus, the processor may obtain the second measurement value for the second sound through the microphone 120 (S330). In addition, the processor 130 may receive, through the communication interface 110, the third measurement value for the second sound measured by the first external electronic apparatus from the first external electronic apparatus.

The processor 130 may obtain the correction value for the measurement value of the sound obtained through the microphone 120 based on the first measurement value, the second measurement value, the third measurement value, the first expectation value, the second expectation value, and the third expectation value (S340).

The operation of obtaining the correction value will be described in detail with reference to the drawings.

Hereinafter, the operation of the electronic apparatus 100 will be described in more detail with reference to FIGS. 4 to 18. For convenience of description, individual embodiments will be described with reference to FIGS. 4 to 18. However, individual embodiments of FIGS. 4 to 18 may be performed in a combined state.

Figure 4:
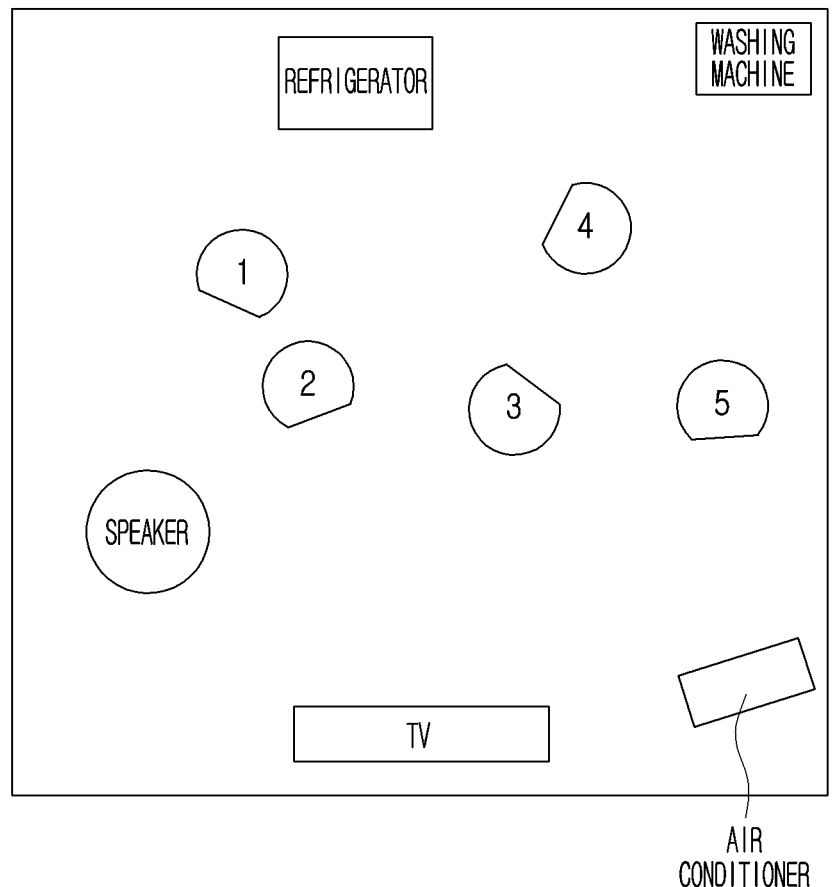
FIG. 4 is a diagram illustrating a limited environment according to an embodiment.

FIG. 4 is a diagram illustrating a limited environment according to an embodiment.

Referring to FIG. 4, each of the plurality of electronic apparatuses may measure the sound at locations of external electronic apparatuses. In addition, the plurality of electronic apparatuses may measure the sound at each of locations 1, 2, 3, 4, and 5 by the other movable electronic apparatus. In addition, each of the plurality of electronic apparatuses may perform tuning by considering a difference in terms of hardware and the like and obtain the expectation value for the sound at the arbitrary location.

However, in practice, the arrangement state of the plurality of electronic apparatuses may be changed, and the actual usage environment such as the environment where the obstacle is placed between the plurality of electronic apparatuses may be different from FIG. 4.

Figure 5:
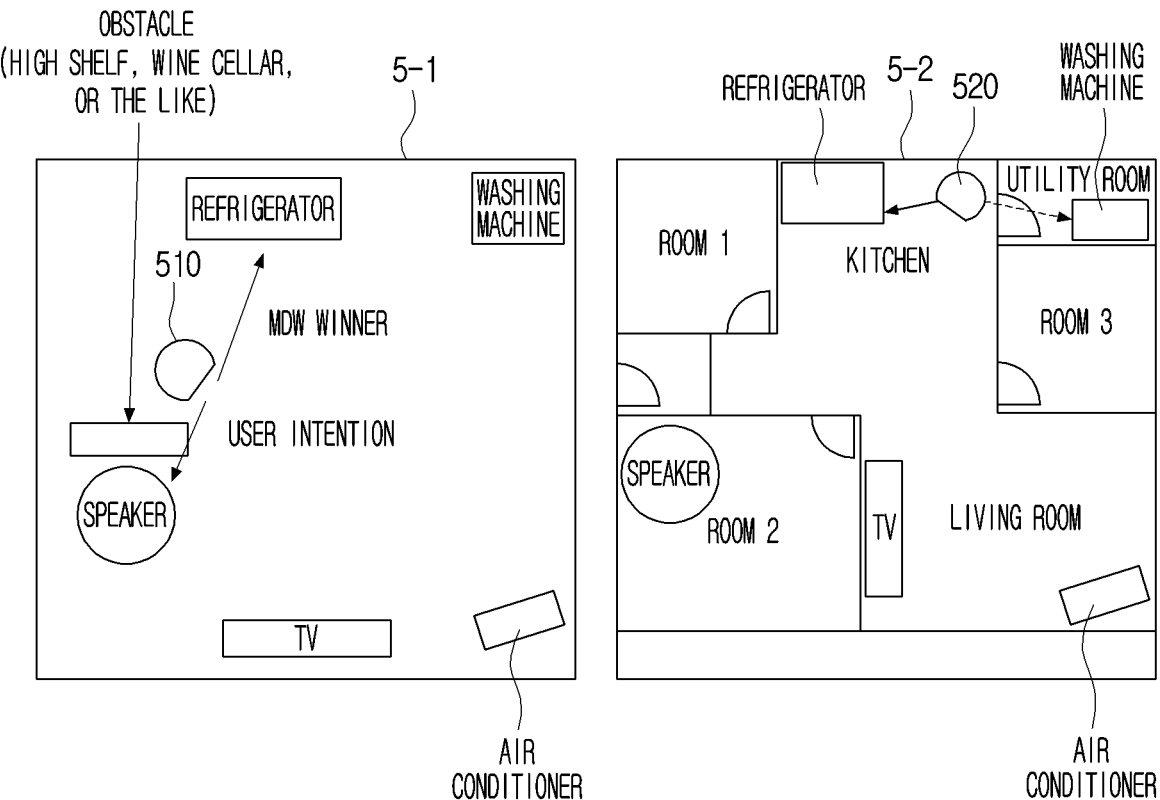
FIG. 5 is a diagram illustrating an actual environment according to various
embodiments.

FIG. 5 is a diagram illustrating an actual environment according to various embodiments.

As illustrated in a left drawing 5-1 of FIG. 5, an obstacle such as a high shelf or a wine cellar may be placed in front of a speaker, and even if a user 510 speaks towards the speaker, the measurement value of the speaker may be reduced due to the obstacle, and a refrigerator having a measurement value more than that of the speaker relatively may be woken up. In other words, an apparatus that does not correspond to an intention of the user 510 may operate due to the obstacle.

In addition, as illustrated in a left drawing 5-2 of FIG. 5, a washing machine may be placed in a narrow space, and even if a user 520 speaks towards a refrigerator which is at a closer distance than the washing machine relatively, the measurement value of the washing machine may be increased due to the narrow space. In other words, the washing machine may be woken up rather than the refrigerator at a distance closer from the user. In other words, an apparatus which does not correspond to an invention of the user 520 may operate due to the arrangement space.

As described above, each of the plurality of electronic apparatuses may erroneously operate according to the arrangement state or the like and thus needs to be operated by reflecting the arrangement state or the like.

Figure 6:
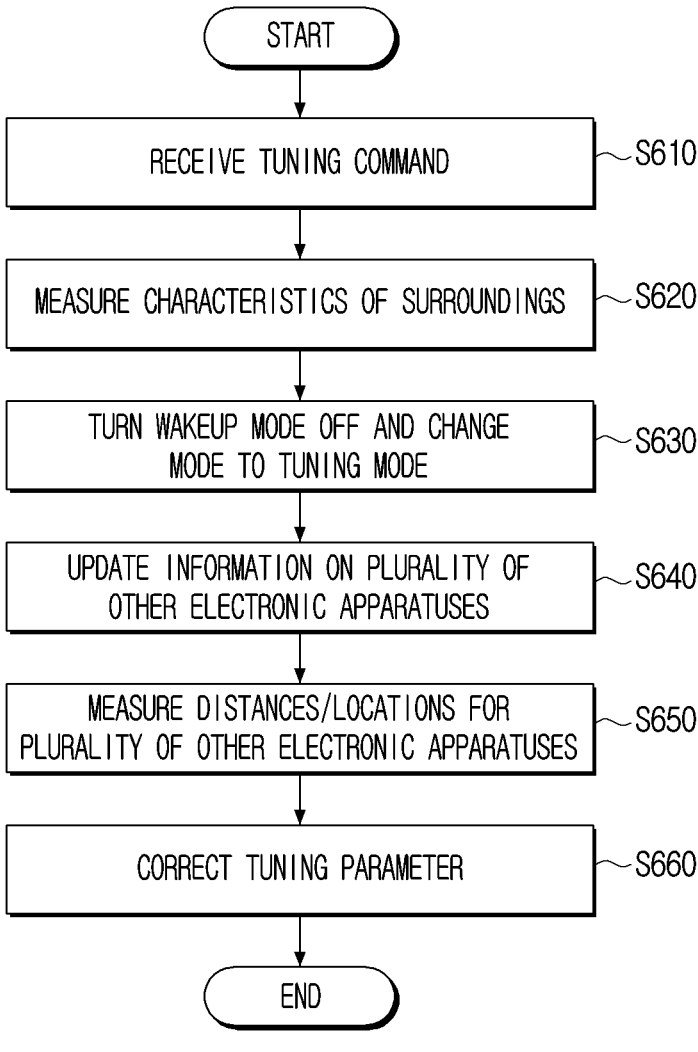
FIG. 6 is a flowchart illustrating a tuning operation according to an embodiment.

FIG. 6 is a flowchart illustrating a tuning operation according to an embodiment.

First, the processor 130 may receive a tuning command of the user (S610). However, there is no limitation thereto, and as described above, an operation after the tunning command may be performed with a reason such as addition of a new apparatus and the like. In addition, the memory of the electronic apparatus 100 may store a neural network model for identifying a tuning operation, and the processor 130 may identify whether the tuning operation is performed by inputting information on the electronic apparatus 100 and the plurality of external electronic apparatuses to the neural network model.

The processor 130 may measure characteristics of surroundings of the electronic apparatus 100 (S620). For example, the processor 130 may measure reverberation at an installation location by reproducing a variable frequency pink noise. However, there is no limitation thereto, and the processor 130 may further reproduce an inaudible sound, a white noise, and the like, in addition to the pink noise.

The processor 130 may turn a wakeup mode off and change the mode to a tuning mode (S630). In a case where the electronic apparatus 100 is in the wakeup mode, when the processor 130 receives the wakeup command of the user and a measurement value is the largest among those of the electronic apparatus 100 and the plurality of external electronic apparatuses, the electronic apparatus may be woken up. In a case where the electronic apparatus 100 is in the tuning mode, even when the processor 130 receives the wakeup command of the user and a measurement value is the largest among those of the electronic apparatus 100 and the plurality of external electronic apparatuses, the electronic apparatus may not be woken up. In other words, the tuning mode may be a mode for performing the tuning operation such as sound output and obtaining, obtaining/calculation of a measurement value and a correction value, or the like.

The processor 130 may update information on the plurality of external electronic apparatuses (S640). For example, as illustrated in FIG. 7, the processor 130 may update information on a list of the plurality of external electronic apparatuses, locations of the plurality of external electronic apparatuses, apparatus characteristics, apparatus surrounding characteristics, a signal intensity for each noise type for each of the plurality of external electronic apparatuses, and the like.

The processor 130 may receive information on each of the plurality of external electronic apparatuses from each of the plurality of external electronic apparatuses and update the information on the plurality of external electronic apparatuses. In addition, the processor 130 may receive the information on the plurality of external electronic apparatuses through the server and update the information on the plurality of external electronic apparatuses.

The processor 130 may update the information on the plurality of external electronic apparatuses through the external server. In addition, the processor 130 may receive data form each of the plurality of external electronic apparatuses and update the information on the plurality of external electronic apparatuses.

Such an operation may be performed by all of the plurality of external electronic apparatuses in the same manner.

The processor 130 may measure distances/locations for the plurality of external electronic apparatuses (S650). Such an operation may be performed by all of the plurality of external electronic apparatuses connected to the network in the same manner. However, there is no limitation thereto, and the electronic apparatus 100 and the plurality of external electronic apparatuses may store location information for all electronic apparatuses in advance, and in this case, the step S650 may be omitted.

Figure 8:
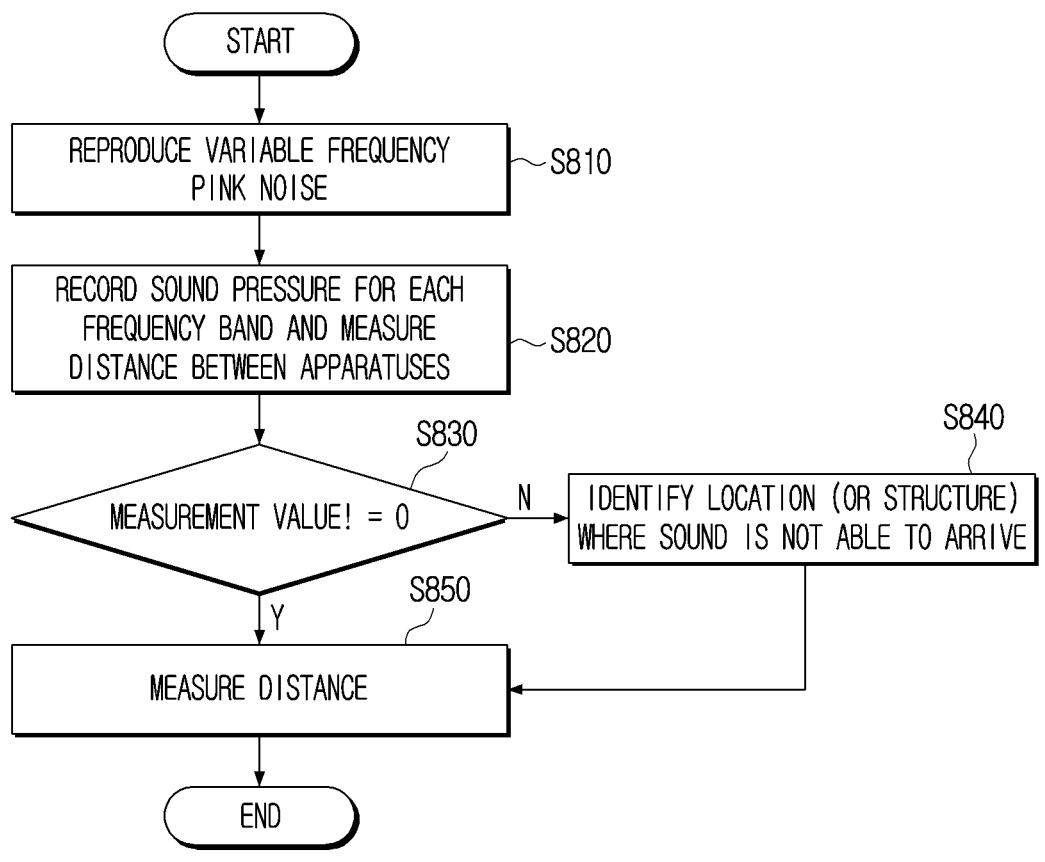
FIG. 8 is a flowchart illustrating a method for obtaining location information according to an embodiment.

A specific method for measuring the location information will be described with reference to FIG. 8. First, the processor 130 may reproduce the variable frequency pink noise (S810). However, there is no limitation thereto, and the processor 130 may further reproduce inaudible sound, white noise, and the like in addition to the pink noise.

The processor 130 may record a sound pressure for each frequency band for the sound output from the external electronic apparatus and measure a distance between apparatuses (S820). Herein, when the measurement value is 0, the processor 130 may identify the electronic apparatus has a location or a structure where the sound is not able to arrive (S840). In addition, when the measurement value is not 0, the processor 130 may measure the distance (S850). For example, the processor 130 may measure the distance based on a Wi-Fi signal or the like and a method for measuring the distance is not limited. Such an operation may be performed by all of the plurality of external electronic apparatuses in the same manner.

Returning to FIG. 6, the processor 130 may obtain the location information for the plurality of external electronic apparatuses and then correct a tuning parameter (S660). Such an operation may be performed by all of the plurality of external electronic apparatuses connected to the network.

A specific method for correcting the tuning parameter will be described with reference to FIG. 9. First, the processor 130 may measure installation location environment information (S910). For example, at the time of tuning, the measurement value may be distorted by the surrounding noise such as outside sounds, human voices, or the like, and the processor 130 may measure the installation location environment information and minimize the distortion.

In addition, the processor 130 may reflect environment information (S920). For example, the processor 130 may reflect the environment information such as the surrounding noise to a size of the measurement value or a signal-to-noise ratio (SNR).

In addition, the processor 130 may change setting with a speaker volume for tuning (S930) and reproduce a wakeup trigger audio (S940). Such an operation may be performed by the external electronic apparatuses in the same manner, and in this case, the processor 130 may obtain the sound output from the external electronic apparatuses as the measurement value.

In addition, the processor 130 may record a score between apparatuses (S950). For example, the processor 130 may obtain a size of the sound output from the external electronic apparatus as the measurement value and obtain the score by updating the measurement value based on speaker characteristics of the external electronic apparatus, microphone characteristics of the electronic apparatus 100, the environment information, and the like. For convenience of description, it is assumed that only the speaker characteristics are different for each apparatus and all other elements are set in the same. For example, when the speaker of the external electronic apparatus has an output less than an average output of the apparatuses, the processor 130 may correct the measurement value of the sound output from the external electronic apparatus to be higher and obtain the value as the score.

The processor 130 may share the score with the plurality of external electronic apparatuses (S960) and obtain the correction value by the relative distance/relative location for each device (S970). For example, the processor 130 may obtain the first expectation value for the first sound output from the first external electronic apparatus based on the location information of the first external electronic apparatus and compare this with a first output value for the first sound. The processor 130 may perform such an operation for each of the plurality of external electronic apparatuses, determine existence of the obstacle, the installation environment of the electronic apparatus 100, and the like, and obtain the correction value according to a determination result. A more specific embodiment will be described with reference to the following drawings.

The processor 130 may end the tuning mode, update the mode to the wakeup mode, and restore the volume (S980). Such an operation may be performed by all of the plurality of external electronic apparatuses connected to the network in the same manner.

FIG. 10 is a diagram illustrating a method for obtaining a correction value according to an embodiment.

An upper diagram 10-1 of FIG. 10 is a diagram illustrating a case where an installation location of an apparatus C is a location with a great reverberation and a measurement value of the apparatus C is more than an expectation value. In the upper diagram 10-1 of FIG. 10, it is assumed that an expectation value for a sound output from an apparatus A is 0.7 while a measurement value is 0.85, and an expectation value for a sound output from an apparatus B is 0.8 while a measurement value is 0.95. This is because of a low height of the ceiling or the reverberation, and an apparatus C may obtain −0.15 as the correction value. In other words, the apparatus C may reduce the measurement value of the sound obtained subsequently by 0.15.

Particularly, the apparatus C may identify that the apparatus to operate is changed according to an increase in measurement value. For example, the apparatus A should have an operation priority higher than that of the apparatus C according to the sound at a location B, in a case of the upper diagram 10-1 of FIG. 10, the priority of the apparatus C may increase to be higher than that of the apparatus A. In other words, in this case, the correction for the measurement value of the apparatus C may be an essential operation.

A lower diagram 10-2 of FIG. 10 is a diagram illustrating a case where the measurement value of the apparatus C is less than the expectation value, and it is assumed that the expectation value for the sound output from the apparatus A is 0.7 while the measurement value is 0.6, and the expectation value for the sound output from the apparatus B is 0.8 while the measurement value is 0.65. This is because of a sound-absorbing element and the apparatus C may obtain +0.1 to +0.15 as the correction value. In other words, the apparatus C may increase the measurement value of the sound obtained subsequently by 0.15.

However, there is no limitation thereto, and in a case of the lower diagram 10-2 of FIG. 10, the correction may not be performed. This is because, in a case of the lower diagram 10-2 of FIG. 10, the priority of the apparatus to operate is not changed, unlike the upper diagram 10-1 of FIG. 10.

FIG. 11 is a diagram illustrating an operation of additionally considering data between other apparatuses according to an embodiment.

An upper diagram 11-1 of FIG. 11 shows expectation values, a lower diagram 11-2 of FIG. 11 shows measurement values, the measurement value between the apparatus A and the apparatus C was increased than the expectation value by 0.1, and the measurement value between the apparatus B and the apparatus C was increased than the expectation value by 0.1.

However, the measurement value between the apparatus A and the apparatus B was reduced than the expectation value by 0.2, and this indicates that an obstacle may exist between the apparatus A and the apparatus B. In addition, according to the expectation values, the operation priority of the apparatus B should be higher than that of the apparatus C according to the sound at a location A, however, according to the measurement values, the operation priority of the apparatus C is higher than that of the apparatus B according to the sound at the location A. In other words, according to the change of the priority, the measurement value between the apparatus A and the apparatus B needs to be corrected, and since the other measurement values were increased by 0.1 and the measurement value between the apparatus A and the apparatus B was reduced by 0.2, a correction value of 0.3 may be obtained. Herein, the obtained correction value may not be applied to the measurement values of all sounds. For example, the apparatus A may increase the measurement value of the sound output at a location within a threshold range based on a location of the apparatus B by 0.3. In addition, the apparatus B may increase the measurement value of the sound output at a location within a threshold range based on a location of the apparatus A by 0.3.

Herein, the threshold range may be a range of a predetermined angle. In the above example, the apparatus B may correct the sound input from a location in a range of 30 degrees of right and left sides based on the apparatus A and may not correct the sound input from a location in the other range.

However, there is no limitation thereto and the threshold range may be determined by further considering the location of the apparatus C. In the above example, the apparatus B may determine the threshold range by equally dividing the angle formed by a straight line from the apparatus B to the apparatus A and a straight line from the apparatus B to the apparatus C. In other words, the apparatus B may correct only the sound input from a location in a range of 45 degrees clockwise and a range of 45 degrees counterclockwise from the straight line from the apparatus B to the apparatus A.

Figure 12:
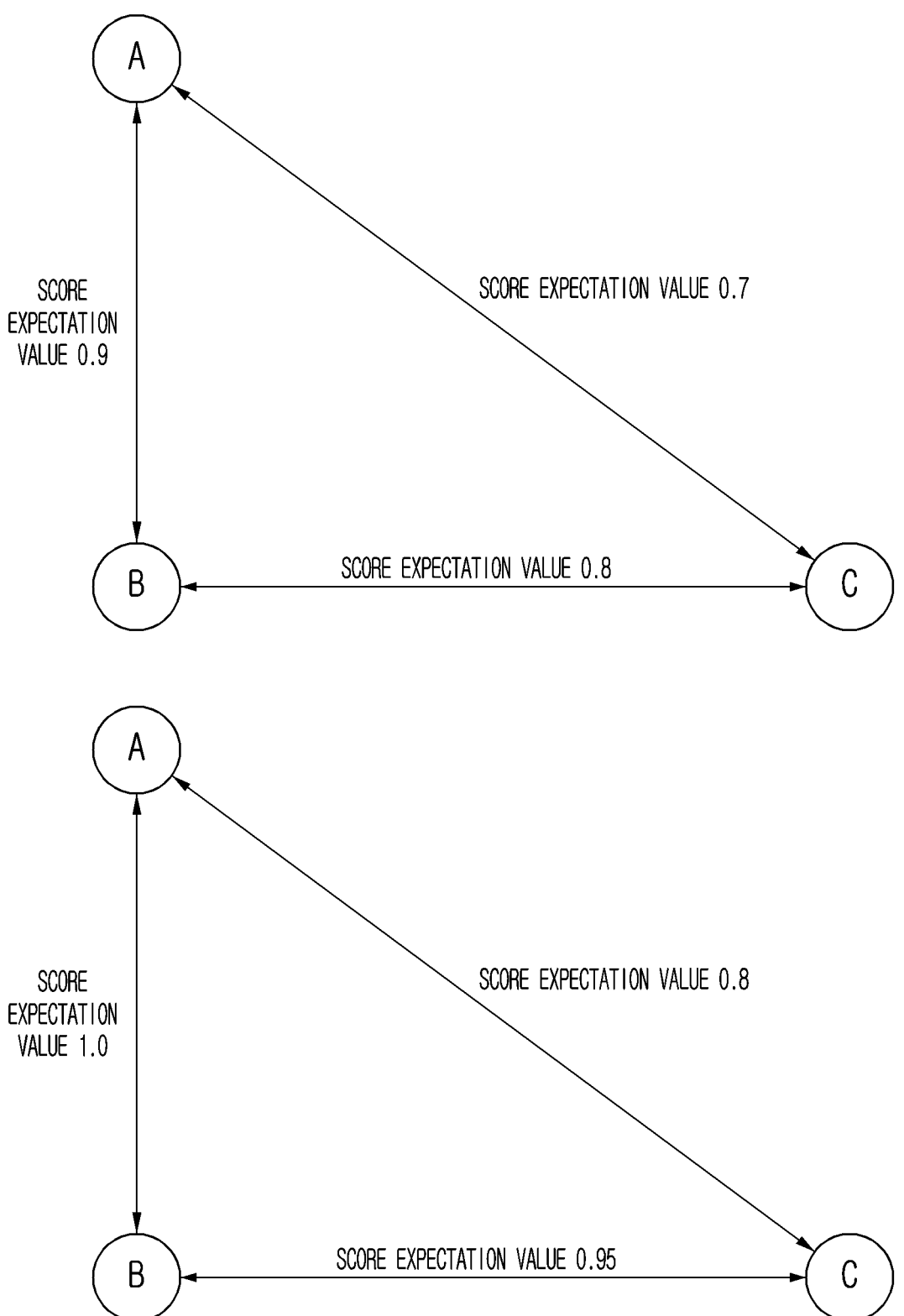
FIG. 12 is a diagram illustrating an operation of additionally considering data between external apparatuses according to another embodiment.

FIG. 12 is a diagram illustrating an operation of additionally considering data between other apparatuses according to another embodiment.

An upper diagram of FIG. 12 shows expectation values, a lower diagram of FIG. 12 shows measurement values, the measurement value between the apparatus A and the apparatus B was increased than the expectation value by 0.1, and the measurement value between the apparatus A and the apparatus C was increased than the expectation value by 0.1.

However, the measurement value between the apparatus B and the apparatus C was increased than the expectation value by 0.15. However, according to the expectation values, the operation priority of the apparatus B is higher than that of the apparatus A according to the sound at a location C, and, even according to the measurement values, the operation priority of the apparatus B is higher than that of the apparatus B according to the sound at the location C. In other words, the priority order is not changed and it is not necessary to correct the measurement value between the apparatus B and the apparatus C. However, it may be corrected with other measurement values, and since the other measurement value were increased by 0.1 and the measurement value between the apparatus B and the apparatus C was increased by 0.15, a correction value of −0.05 may be obtained. Herein, the obtained correction value may not be applied to the measurement values of all sounds. For example, the apparatus B may reduce the measurement value of the sound output at the location within the threshold range based on the location of the apparatus C by 0.05. In addition, the apparatus C may increase the measurement value of the sound output at the location within the threshold range based on the location of the apparatus B by 0.05. However, there is no limitation thereto and, not only −0.05, but a value between −0.05 to 0 may be used for the correction value.

Figure 13:
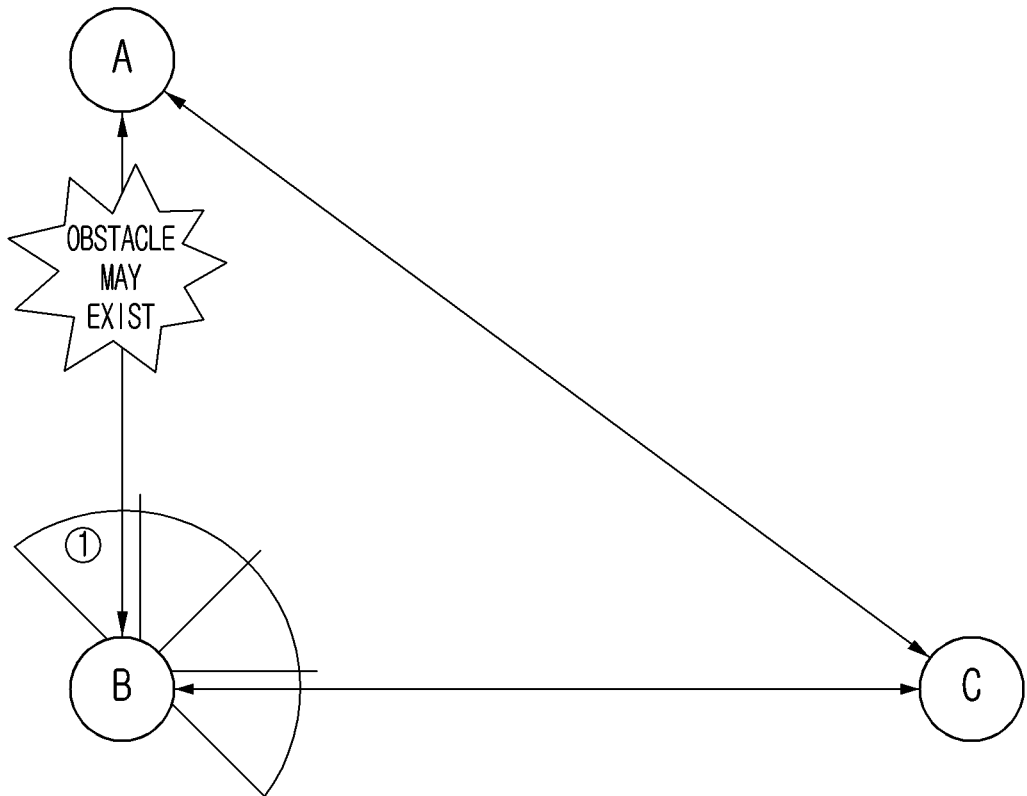
FIG. 13 is a diagram illustrating a case where an obstacle exists in one direction according to an embodiment.

FIG. 13 is a diagram illustrating a case where an obstacle exists in one direction according to an embodiment.

As illustrated in FIG. 13, an obstacle may exist between the apparatus B and the apparatus A. At that time, the apparatus B may identify 45 degrees as one range and identify an apparatus A direction as a range ①. Then, the apparatus B may perform the correction for the sound output at a location in the range ①.

In FIG. 13, for convenience of description, 45 degrees are described as one range, but this range may be set differently. For example, the apparatus B may determine 90 degrees as one range by further considering the apparatus C, in addition to the apparatus A.

Figure 14:
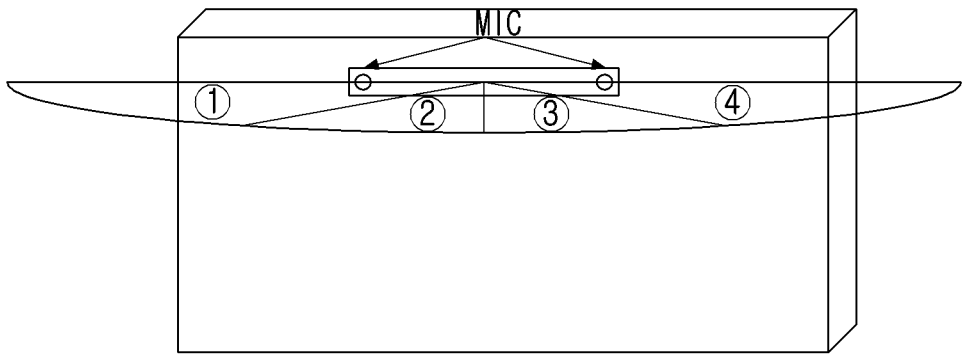
FIG. 14 is a diagram illustrating a method for identifying a direction according to an embodiment.

FIG. 14 is a diagram illustrating a method for identifying a direction according to an embodiment.

The apparatus 100 may include a plurality of microphones. For example, as illustrated in FIG. 14, the apparatus 100 may include at least two microphones on the same horizontal line.

In this case, the processor 130 may identify an output direction of a sound based on a frequency, a received time, and the like of a sound received from the two microphones.

However, there is no limitation thereto and the electronic apparatus 100 may include three or more microphones.

Figure 15:
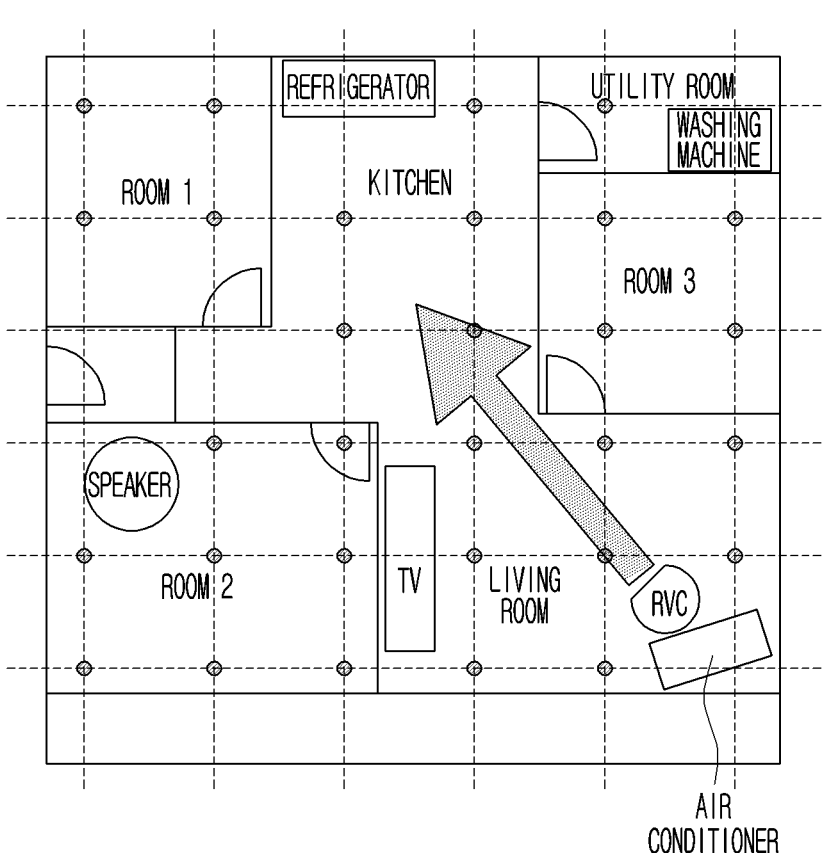
FIG. 15 is a diagram illustrating tuning performed using a movable apparatus according to another embodiment.

FIG. 15 is a diagram illustrating tuning performed using a movable apparatus according to another embodiment.

The processor 130 may obtain a correction value based on a sound output from a robot cleaner (RVC). For example, as illustrated in FIG. 15, the processor 130 may transmit a sound output request signal for a plurality of locations represented as points between lattices to the robot cleaner. The robot cleaner may output a sound at a plurality of locations while moving in a space.

However, there is no limitation thereto, and the robot cleaner may store information on the plurality of locations and transmit the stored information to a plurality of external electronic apparatuses, in addition to the electronic apparatus 100. In addition, it is described that the movable apparatus is the robot cleaner, but this is merely an embodiment, and it may be any apparatus as long as it is movable in the space.

Figure 16:
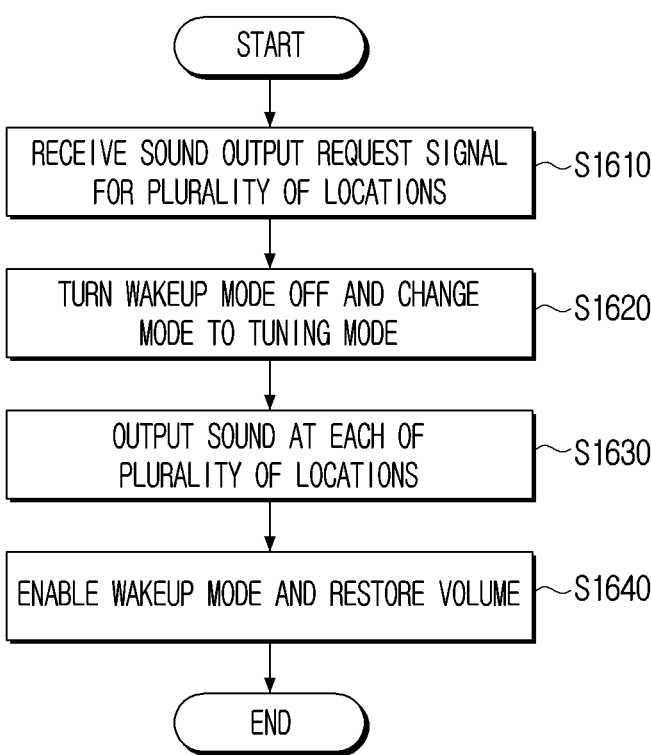
FIG. 16 is a flowchart illustrating tuning performed using a movable apparatus according to an embodiment.

FIG. 16 is a flowchart illustrating tuning performed using a movable apparatus according to an embodiment. In FIG. 16, for convenience of description, the operations of the electronic apparatus 100 overlapped with some operations of FIG. 6 are not repeated and it is described that the movable apparatus is the robot cleaner.

The robot cleaner may receive a sound output request signal for a plurality of locations from the electronic apparatus 100 (S1610). For example, when the mode is changed to the tuning mode, the electronic apparatus 100 may transmit the sound output request signal for the plurality of locations to the robot cleaner.

When the sound output request signal is received, the robot cleaner may turn the wakeup mode off and change the mode to the tuning mode (S1620). Such a mode change may be the same as the operation in S630 of FIG. 6.

The robot cleaner may reproduce pink noise at each of the plurality of locations while moving in the space (S1630). However, there is no limitation thereto, and the robot cleaner may reproduce, not only the pink noise, but also white noise, voices (wakeup command and the like), inaudible sounds, and the like at each of the plurality of locations.

At that time, the robot cleaner may measure reverberation before outputting the sound at each of the plurality of locations and transmit the measured reverberation to the electronic apparatus 100.

In addition, the robot cleaner may measure reverberation by outputting at least one of a sweep signal in which a frequency changes, a pink noise, a white noise, or an inaudible sound, and perform the tuning by outputting at least one of a sound corresponding to the wakeup command, a sound in a speech range, or an inaudible sound. Herein, in a case of outputting a plurality of sounds, the plurality of sounds may be output sequentially for each type. However, there is no limitation thereto and the robot cleaner may perform the tuning by outputting the pink noise or the white noise.

The electronic apparatus 100 may obtain the correction value based on the information received from the robot cleaner.

Figure 17:
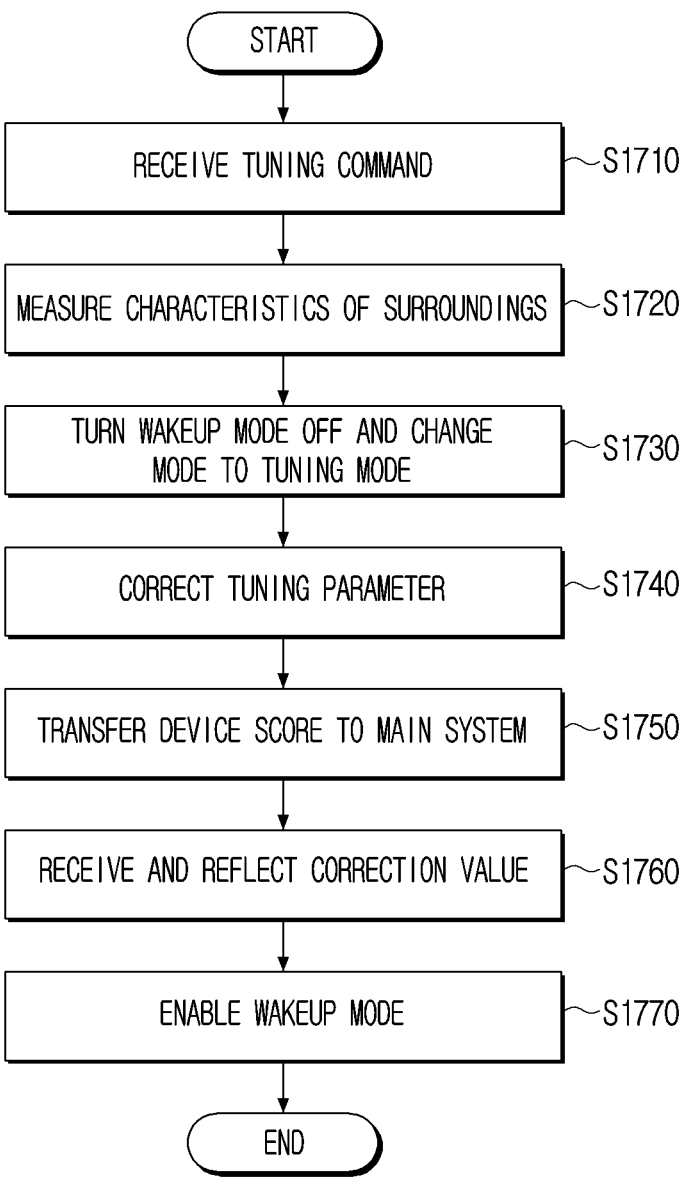
FIG. 17 is a flowchart illustrating a method for obtaining correction values of a plurality of external electronic apparatuses by the electronic apparatus according to an embodiment.

FIG. 17 is a flowchart illustrating a method for obtaining correction values of a plurality of external electronic apparatuses by the electronic apparatus according to an embodiment. In FIG. 17, steps S1750 to S1760 will be described, since the step S1740 to the step S1770 are the same as those described with reference to FIG. 6.

The plurality of external electronic apparatuses may transmit the score to the apparatus (main system) 100 (S1750).

The processor 130 may collect data, calculate the correction value by the relative distance/relative location for each apparatus, and transmit this to the corresponding apparatus. The plurality of external electronic apparatuses may receive and reflect the correction value (S1760).

The processor 130 may perform the operation described above, when the hardware performance is low among the plurality of external electronic apparatuses.

FIG. 18 is a flowchart illustrating a method for obtaining correction values of a plurality of external electronic apparatuses by the electronic apparatus 100 according to an embodiment. In FIG. 18, it is illustrated that the electronic apparatus 100 is a refrigerator.

The electronic apparatus 100 may store an expectation value of each of a speaker, a washing machine, a TV, and an air conditioner. For example, as illustrated in an upper diagram 18-1 of FIG. 18, for the sound output from the electronic apparatus 100, an expectation value of the speaker may be 0.7, an expectation value of the washing machine may be 0.85, an expectation value of the TV may be 0.5, and an expectation value of the air conditioner may be 0.4.

Then, when the sound is output from the electronic apparatus 100, each of the speaker, the washing machine, the TV, and the air conditioner may obtain the measurement value for the sound and transmit the obtained measurement value to the electronic apparatus 100. For example, as illustrated in a middle diagram 18-2 of FIG. 18, a measurement value of the speaker may be 0.7, a measurement value of the washing machine may be 0.9, a measurement value of the TV may be 0.46, and a measurement value of the air conditioner may be 0.46.

Herein, as illustrated in a lower diagram 18-3 of FIG. 18, the processor 130 may determine that the operation priority of the TV and the air conditioner may be changed and transmit a correction value of +0.05 to the TV. Specifically, the processor 130 may correct so that the measurement value of the TV is more than the measurement value of the air conditioner having an expectation value less than that of the TV, and correct so that the measurement value of the TV is less than the measurement value of the speaker having an expectation value more than that of the TV.

Figure 19:
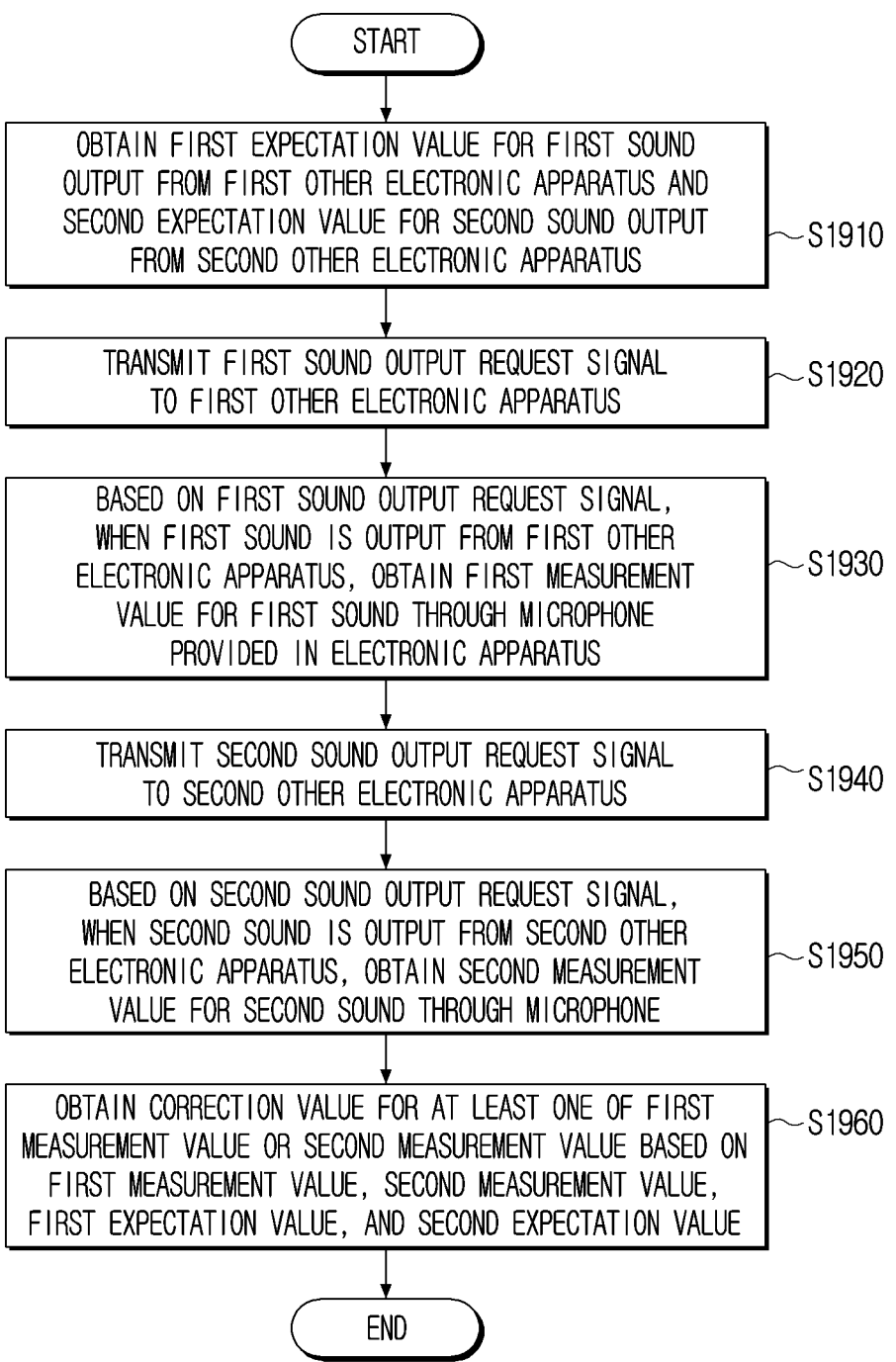
FIG. 19 is a flowchart illustrating a method for controlling the electronic apparatus according to an embodiment.

FIG. 19 is a flowchart illustrating a method for controlling the electronic apparatus according to an embodiment.

First, the first expectation value for the first sound output from the first external electronic apparatus and the second expectation value for the second sound output from the second external electronic apparatus may be obtained (S1910). In addition, the first sound output request signal may be transmitted to the first external electronic apparatus (S1920). Further, based on the first sound output request signal, when the first sound is output from the first external electronic apparatus, the first measurement value for the first sound may be obtained through the microphone provided in the electronic apparatus (S1930). In addition, the second sound output request signal may be transmitted to the second external electronic apparatus (S1940). Further, based on the second sound output request signal, when the second sound is output from the second external electronic apparatus, the second measurement value for the second sound may be obtained through the microphone provided in the electronic apparatus (S1950). In addition, the correction value for the measurement value of the sound obtained through the microphone may be obtained based on the first measurement value, the second measurement value, the first expectation value, and the second expectation value (S1960). Herein, the first expectation value may be a predicted measurement value of the first sound by the electronic apparatus based on the first location information of the first external electronic apparatus, and the second expectation value may be a predicted measurement value of the second sound by the electronic apparatus based on the second location information of the second external electronic apparatus.

In addition, the obtaining the correction value (S1960) may include, based on the first measurement value being more than the first expectation value and the second measurement value being more than the second expectation value, obtaining a negative correction value for the measurement value of the sound obtained through the microphone, based on the first measurement value being less than the first expectation value and the second measurement value being less than the second expectation value, obtaining a positive correction value for the measurement value of the sound obtained through the microphone.

In addition, the obtaining the correction value (S1960) may include, based on the first measurement value being not within the first threshold range based on the first expectation, and the second measurement value being within the second threshold range based on the second expectation value, obtaining the correction value for the measurement value of the sound output at the location within the threshold range based on the location corresponding to the first location information based on the change of the apparatus which operates according to the wakeup command.

Herein, the obtaining the correction value (S1960) may include, based on the apparatus which operates according to the wakeup command being changed, obtaining the correction value so that the apparatus which operates is restored, and based on the apparatus which operates according to the wakeup command being not changed, obtaining the correction value as 0 or obtaining the correction value within a range in which the apparatus which operates is not changed.

Meanwhile, the method may further include receiving the third measurement value for the second sound measured by the first external electronic apparatus and the third expectation value which is a predicted measurement value of the second sound by the first external electronic apparatus based on the second location information from the first external electronic apparatus, and the obtaining the correction value (S1960) may include obtaining the correction value for the measurement value of the sound obtained through the microphone based on the first expectation value, the second measurement value, the third measurement value, the first expectation value, the second expectation value, and the third expectation value.

Herein, the obtaining the correction value (S1960) may include, based on the first measurement being not within the first threshold range based on the first expectation value, the second measurement value being not within the second threshold range based on the second expectation value, and the third measurement value being within the third threshold range based on the third expectation value, obtaining the correction value for the measurement value of the sound obtained through the microphone.

In addition, the obtaining the correction value (S1960) may include, based on the first measurement value being not within the first threshold range based on the first expectation value, the second measurement value being within the second threshold range based on the second expectation value, and the third measurement value being within the third threshold range based on the third expectation value, obtaining the correction value for the measurement value of the sound output at the location within the threshold range based on the location corresponding to the first location information based on the change of the apparatus which operates according to the wakeup command.

According to various embodiments of the disclosure described above, the electronic apparatus may correct the measurement value of the sound obtained by the electronic apparatus by reflecting the installation environment and the measurement value of the sound between the plurality of surrounding apparatuses, and determine the operation based on the corrected measurement value, thereby improving an accuracy of the operation.

In addition, the electronic apparatus may perform the correction operation according to an event in which a new surrounding apparatus is added or the like to increase the accuracy of the operation periodically.

Meanwhile, it is described above that the electronic apparatus transmits the sound output request signal to the plurality of external electronic apparatuses and measure the sound output from the plurality of external electronic apparatuses, but there is no limitation thereto. For example, the electronic apparatus may transmit a sound measurement request signal to the plurality of external electronic apparatuses and obtain the correction value by receiving the sound measured by the plurality of external electronic apparatuses according to the output of the sound. In a case, the electronic apparatus may provide the correction value for the plurality of external electronic apparatuses.

Various embodiments of the disclosure may be implemented as software including instructions stored in machine (e.g., computer)-readable storage media. The machine is an apparatus which invokes instructions stored in the storage medium and is operated according to the invoked instructions, and may include an electronic apparatus (e.g., electronic apparatus A) according to the disclosed embodiments. In a case where the instruction is executed by a processor, the processor may perform a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory" storage medium is tangible and may not include signals, and it does not distinguish that data is semi-permanently or temporarily stored in the storage medium.

According to an embodiment, the methods according to various embodiments disclosed in this disclosure may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product may be at least temporarily stored or temporarily generated in a storage medium such as a memory of a server of a manufacturer, a server of an application store, or a relay server.

According to an embodiment of the disclosure, the embodiments described above may be implemented in a recording medium readable by a computer or a similar device using software, hardware, or a combination thereof. In some cases, the embodiments described in this specification may be implemented as a processor itself. According to the implementation in terms of software, the embodiments such as procedures and functions described in this specification may be implemented as separate software modules. Each of the software modules may perform one or more functions and operations described in this specification.

Computer instructions for executing processing operations according to the embodiments of the disclosure descried above may be stored in a non-transitory computer-readable medium. When the computer instructions stored in such a non-transitory computer-readable medium are executed by the processor of a specific machine, the processing operation of the machine according to various embodiments described above may be executed by the specific machine. The non-transitory computer-readable medium is not a medium storing data for a short period of time such as a register, a cache, or a memory, but may refer to a medium that semi-permanently stores data and is readable by a machine. Specific examples of the non-transitory computer-readable medium may include a CD, a DVD, a hard disk drive, a Blu-ray disc, a USB, a memory card, and a ROM.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic apparatus comprising:
a communication interface;
a microphone; and
a processor configured to be connected to the communication interface and the microphone to control the electronic apparatus,
wherein the processor is configured to:
obtain a first expectation value which is a predicted measurement value for a first sound to be output by a first external electronic apparatus based on first location information of the first external electronic apparatus and a second expectation value which is a predicted measurement value for a second sound to be output by a second external electronic apparatus based on second location information of the second external electronic apparatus;
control the communication interface to transmit a first sound output request signal to the first external electronic apparatus to request the first sound to be output by the first external electronic apparatus, and based on the first sound being output from the first external electronic apparatus in response to the transmitted first sound output request signal, obtain a first measurement value for the first sound received through the microphone;

control the communication interface to transmit a second sound output request signal to the second external electronic apparatus to request the second sound to be output by the second external electronic apparatus, and based on the second sound being output from the second external electronic apparatus in response to the transmitted second sound output request signal, obtain a second measurement value for the second sound received through the microphone;

obtain a correction value for one or more of the obtained first measurement value of the received first sound and the obtained second measurement value of the received second sound obtained through the microphone based on the obtained first measurement value, the obtained second measurement value, the obtained first expectation value, and the obtained second expectation value; and based on the obtained first measurement value being not within a first threshold range based on the obtained first expectation value and the obtained second measurement value being within a second threshold range based on the obtained second expectation value, obtain a correction value for a measurement value of a sound output at a location within a threshold range based on a location corresponding to the first location information.

2. The electronic apparatus according to claim 1, wherein the processor is configured to:

based on the obtained first measurement value being more than the obtained first expectation value and the obtained second measurement value being more than the obtained second expectation value, obtain a negative correction value for reducing the one or more of the first measurement value and the second measurement value; and based on the obtained first measurement value being less than the obtained first expectation value and the obtained second measurement value being less than the obtained second expectation value, obtain a positive correction value for increasing the one or more of the first measurement value and the second measurement value.

3. The electronic apparatus according to claim 1, wherein the processor is further configured to, obtain the correction value for the measurement value of the sound output at the location within the threshold range based on the location corresponding to the first location information of the first external electronic apparatus based on a change of an apparatus which operates according to a wakeup command.

4. The electronic apparatus according to claim 3, wherein the processor is configured to:

based on the apparatus which operates according to the wakeup command being changed, obtain the correction value so that the apparatus which operates is restored; and based on the apparatus which operates according to the wakeup command being not changed, obtain the correction value as 0 or obtain the correction value within a range in which the apparatus which operates is not changed.

5. The electronic apparatus according to claim 1, wherein the processor is configured to:

receive a third measurement value for the second sound measured by the first external electronic apparatus and a third expectation value which is a predicted measurement value of the second sound by the first external electronic apparatus based on the second location information of the second external electronic apparatus from the first external electronic apparatus through the communication interface; and obtain the correction value for the measurement value of the sound obtained through the microphone based on the obtained first measurement value, the obtained second measurement value, the received third measurement value, the obtained first expectation value, the obtained second expectation value, and the received third expectation value.

6. The electronic apparatus according to claim 5, wherein the processor is configured to:

based on the first measurement value being not within a first threshold range based on the obtained first expectation value, the obtained second measurement value being not within a second threshold range based on the second expectation value, and the received third measurement value being within a third threshold range based on the received third expectation value, obtain the correction value for the measurement value of the sound obtained through the microphone.

7. The electronic apparatus according to claim 5, wherein the processor is configured to:

based on the first measurement value being not within a first threshold range based on the obtained first expectation value, the obtained second measurement value being within a second threshold range based on the obtained second expectation value, and the received third measurement value being within a third threshold range based on the received third expectation value, obtain a correction value for a measurement value of a sound output at a location within a threshold range based on a location corresponding to the first location information of the first external electronic apparatus based on a change of an apparatus which operates according to a wakeup command.

8. The electronic apparatus according to claim 7, wherein the processor is configured to:

based on the apparatus which operates according to the wakeup command being changed, obtain the correction value so that the apparatus which operates is restored; and based on the apparatus which operates according to the wakeup command being not changed, obtain the correction value as 0 or obtain the correction value within a range in which the apparatus which operates is not changed.

9. The electronic apparatus according to claim 5, wherein the processor is configured to control the communication interface to transmit a signal for requesting the third measurement value and the third expectation value based on hardware performance of the first external electronic apparatus to the first external electronic apparatus.

10. The electronic apparatus according to claim 1, wherein the processor is configured to:

control the communication interface to transmit the first expectation value request signal for the first external electronic apparatus and the second expectation value request signal for the second external electronic apparatus to an external server; and receive the first expectation value and the second expectation value from the external server through the communication interface.

11. The electronic apparatus according to claim 1, further comprising:
  a memory configured to store first information for the first expectation value based on a distance between the electronic apparatus and the first external electronic apparatus and second information for the second expectation value based on a distance between the electronic apparatus and the second external electronic apparatus,
  wherein the processor is configured to:
  control the communication interface to transmit a request signal for the first location information of the first external electronic apparatus and the second location information of the second external electronic apparatus to an external server;
  receive the first location information and the second location information from the external server through the communication interface; and
  obtain the first expectation value corresponding to the first location information based on the first information and the second expectation value corresponding to the second location information based on the second information.

12. The electronic apparatus according to claim 1, wherein the processor is configured to:
  obtain a plurality of fourth expectation values for a third sound to be output from a third external electronic apparatus at a plurality of locations;
  control the communication interface to transmit a third sound output request signal at the plurality of locations to the third external electronic apparatus to request the third sound to be output by the third external electronic apparatus;
  based on the third sound being output by the third external electronic apparatus at each of the plurality of locations in response to the transmitted third sound output request signal, obtain a plurality of fourth measurement values for the third sound at each of the plurality of locations through the microphone; and
  obtain a correction value for a sound measured through the microphone based on the obtained first measurement value, the obtained second measurement value, the obtained plurality of fourth measurement values, the obtained first expectation value, the obtained second expectation value, and the obtained plurality of fourth expectation values,
  wherein the third external electronic apparatus is a movable apparatus so that a location of the third external electronic apparatus is changeable, and
  wherein the obtained plurality of fourth expectation values is predicted measurement values of the third sound to be output by the electronic apparatus at the plurality of locations.

13. The electronic apparatus according to claim 1, wherein the processor is configured to:
  based on a wakeup command being received, obtain a measurement value of the electronic apparatus for the wakeup command through the microphone;
  correct the measurement value based on the correction value;
  receive a corrected measurement value of the first external electronic apparatus for the wakeup command from the first external electronic apparatus and receive a corrected measurement value of the second external electronic apparatus for the wakeup command from the second external electronic apparatus through the communication interface; and

32 based on the corrected measurement value being more than the corrected measurement value of the first external electronic apparatus and the corrected measurement value of the second external electronic apparatus, wake up the electronic apparatus based on the wakeup command.

14. A method for controlling an electronic apparatus, the method comprising:
  obtaining a first expectation value which is a predicted measurement value for a first sound to be output by a first external electronic apparatus based on first location information of the first external electronic apparatus and a second expectation value which is a predicted measurement value for a second sound to be output by a second external electronic apparatus based on second location information of the second external electronic apparatus;
  transmitting a first sound output request signal to the first external electronic apparatus to request the first sound to be output by the first external electronic apparatus;
  based on the first sound being output from the first external electronic apparatus in response to the transmitted first sound output request signal, obtaining a first measurement value for the first sound received through a microphone included in the electronic apparatus;
  transmitting a second sound output request signal to the second external electronic apparatus to request the second sound to be output by the second external electronic apparatus;
  based on the second sound being output from the second external electronic apparatus in response to the transmitted second sound output request signal, obtaining a second measurement value for the second sound received through the microphone; and
  obtaining a correction value for one or more of the first measurement value of the received first sound and the obtained second measurement value of the received second sound obtained through the microphone based on the obtained first measurement value, the obtained second measurement value, the obtained first expectation value, and the obtained second expectation value,
  wherein the obtaining of the correction value includes, based on the obtained first measurement value being not within a first threshold range based on the obtained first expectation value and the obtained second measurement value being within a second threshold range based on the second expectation value, obtaining a correction value for a measurement value of a sound output at a location within a threshold range based on a location corresponding to the first location information.

15. The method according to claim 14, wherein the obtaining of the correction value includes, based on the obtained first measurement value being more than the obtained first expectation value and the obtained second measurement value being more than the second expectation value, obtaining a negative correction value for reducing the one or more of the first measurement value and the second measurement value, and based on the obtained first measurement value being less than the obtained first expectation value and the obtained second measurement value being less than the obtained second expectation value, obtaining a positive correction value for increasing the one or more of the first measurement value and the second measurement value.

16. The method according to claim 14, wherein the obtaining of the correction value includes, based on the obtained first measurement value being not within the first threshold range based on the obtained first expectation value and the obtained second measurement value being within the second threshold range based on the second expectation value, obtaining the correction value for a measurement value of the sound output at athe location within the threshold range based on the location corresponding to the first location information based on a change of an apparatus which operates according to a wakeup command.

17. The method according to claim 16, wherein the obtaining of the correction value includes, based on the apparatus which operates according to the wakeup command being changed, obtaining the correction value so that the apparatus which operates is restored, and based on the apparatus which operates according to the wakeup command being not changed, obtaining the correction value as 0 or obtaining the correction value within a range in which the apparatus which operates is not changed.

18. The method according to claim 14, wherein the control method further include receiving a third measurement value for the second sound measured by the first external electronic apparatus and a third expectation value which is a predicted measurement value of the second sound by the first external electronic apparatus based on the second location information from the first external electronic apparatus, and the obtaining of the correction value includes obtaining the correction value for the measurement value of the sound obtained through the microphone based on the obtained first measurement value, the obtained second measurement value, the obtained third measurement value, the obtained first expectation value, the obtained second expectation value, and the obtained third expectation value.

19. The method according to claim 18, wherein the obtaining of the correction value includes, based on the obtained first measurement value being not within a first threshold range based on the obtained first expectation value, the obtained second measurement value being not within a second threshold range based on the obtained second expectation value, and the obtained third measurement value being within a third threshold range based on the obtained third expectation value, obtaining the correction value for the measurement value of the sound obtained through the microphone.

* * * * *